(12) United States Patent
Braun

(10) Patent No.: US 12,516,519 B2
(45) Date of Patent: Jan. 6, 2026

(54) STRUCTURAL SLIDING BEARING AND STRUCTURAL BEARING SYSTEM

(71) Applicant: Maurer Engineering GmbH, Munich (DE)

(72) Inventor: Christian Braun, Holzkirchen (DE)

(73) Assignee: Maurer Engineering GmbH, Munich (DE)

( * ) Notice: Subject to any disclaimer, the term of this patent is extended or adjusted under 35 U.S.C. 154(b) by 243 days.

(21) Appl. No.: 17/796,526

(22) PCT Filed: Jan. 29, 2021

(86) PCT No.: PCT/EP2021/052079
§ 371 (c)(1),
(2) Date: Jul. 29, 2022

(87) PCT Pub. No.: WO2021/152073
PCT Pub. Date: Aug. 5, 2021

(65) Prior Publication Data
US 2023/0349147 A1   Nov. 2, 2023

(30) Foreign Application Priority Data

Jan. 29, 2020   (DE) .................... 10 2020 201 078.1

(51) Int. Cl.
*E04B 1/36* (2006.01)
*E01D 19/04* (2006.01)

(52) U.S. Cl.
CPC .............. *E04B 1/36* (2013.01); *E01D 19/042* (2013.01)

(58) Field of Classification Search
CPC ......... E04B 1/36; E01D 19/042; E01D 19/04; E01D 19/047; E01D 19/041
See application file for complete search history.

(56) References Cited

U.S. PATENT DOCUMENTS

| 10,501,899 B2 | 12/2019 | Braun |
| 2010/0195942 A1* | 8/2010 | Tavecchio ............. F16C 33/201 |
| | | 384/36 |
| 2018/0320325 A1* | 11/2018 | Braun ..................... E01D 19/04 |

FOREIGN PATENT DOCUMENTS

| AT | 509869 A4 | 12/2011 |
| CN | 203200650 U | 9/2013 |

(Continued)

OTHER PUBLICATIONS

International Search Report for PCT/EP2021/052079, mailed Apr. 23, 2021 and translation.

(Continued)

*Primary Examiner* — Patrick J Maestri
(74) *Attorney, Agent, or Firm* — IceMiller LLP

(57) ABSTRACT

The present invention relates to a structural sliding bearing 210 for connecting a first structure part to a second structure part. The structural sliding bearing 210 has a bearing base 212 connectable to the first structure part, a sliding plate 216 connectable to the second structure part, and an intermediate bearing part 214 disposed between the bearing base 212 and the sliding plate 216, wherein a primary sliding surface 226 of the structural sliding bearing 210 is disposed between the intermediate bearing part 214 and the sliding plate 216. The primary sliding surface 226 has at least two partial sliding surfaces 228A and 228B, each arranged in sliding planes 230A and 230B angled relative to one another, the sliding planes 230A and 230B meeting at a common line of intersection S that forms an axis of movement A of the structural sliding bearing 210 along which the sliding plate 216 can move. The two sliding planes 230A and 230B include a first angle α, the first angle α being selected such that no gap occurs in the area of the primary sliding surface 226 when the structural sliding bearing 210 is in use. Furthermore, the (Continued)

invention relates to a structural bearing system 700 in which the advantageous principle of the structural sliding bearing 210 is applied.

42 Claims, 12 Drawing Sheets

(56) References Cited

FOREIGN PATENT DOCUMENTS

| | | | |
|---|---|---|---|
| CN | 204570457 U | 8/2015 | |
| CN | 108532451 A | 9/2018 | |
| CN | 108699786 A | 10/2018 | |
| CN | 109750596 A | 5/2019 | |
| DE | 3517895 A1 | 11/1986 | |
| DE | 4039523 A1 | 6/1992 | |
| DE | 10128362 A1 | 12/2002 | |
| EA | 34097 B1 | 12/2019 | |
| JP | S51-92521 A | 8/1976 | |
| JP | S58-129905 U | 9/1983 | |
| JP | S59-500829 A | 5/1984 | |
| JP | S63-190927 A | 8/1988 | |
| JP | H05-30210 U | 4/1993 | |
| JP | H09-210129 A | 8/1997 | |
| JP | 2000104731 A | 4/2000 | |
| JP | 2007211405 A | 8/2007 | |
| JP | 2009144429 A | 7/2009 | |
| JP | 2014012972 A | 1/2014 | |
| JP | 2016216919 A | 12/2016 | |
| JP | 2019007186 A | 1/2019 | |
| KR | 100716088 B1 | 5/2007 | |
| KR | 20130101772 A | 6/2013 | |
| KR | 101575743 B1 | 12/2015 | |
| RU | 138108 U1 | 2/2014 | |
| RU | 2558553 C2 | 8/2015 | |
| RU | 2651686 C2 | 4/2018 | |
| WO | 2012/169669 A1 | 12/2012 | |

OTHER PUBLICATIONS

German Examination Report for DE 10 2020 201 078.1, dated Dec. 7, 2020.
First IPER (International Preliminary Examination Report) for PCT/EP2021/052079 dated Jan. 5, 2022.
Petition in Answer to First IPER, dated Apr. 5, 2022.
Second IPER (International Preliminary Examination Report) for PCT/EP2021/052079, dated May 6, 2022.
Chapter II Request for PCT/EP2021/052079, dated Nov. 29, 2021.
Office Action for Japanese Application No. 2022-545431, dated Oct. 5, 2023 (and translation).
Office Action (and translation) issued in Japanese Application No. 2022-545431, drafted Mar. 11, 2024 [15 pages].
Office Action for RU 2022121162/03, dated Jan. 20, 2023 and translation.
Search Report for RU 2022121162/03, dated Jan. 16, 2023 and translation.
Office Action for Chinese Application No. 202180011527.2, mailed Jan. 10, 2025 [11 pages].

* cited by examiner

PRIOR ART

PRIOR ART

STRUCTURAL SLIDING BEARING AND STRUCTURAL BEARING SYSTEM

CROSS-REFERENCE TO RELATED APPLICATIONS

This application is a National Stage of International Patent Application No. PCT/EP2021/052079, filed on Jan. 29, 2021, which claims priority to German Patent Application No. DE 10 2020 201 078.1, filed on Jan. 29, 2020, the disclosures of which are incorporated by reference in their entireties.

The present invention relates to a structural sliding bearing for connecting first and second structure parts, and to a structural bearing system having at least two sliding bearings for connecting at least two structure parts.

Generic structural sliding bearings usually have a bearing base which can be connected to the first structure part, a sliding plate which can be connected to a second structure part, and an intermediate bearing part which is arranged between the bearing base and the sliding plate. Thereby, the primary sliding surface of the structural sliding bearing is generally arranged between the intermediate bearing part and the sliding plate, along which the sliding plate can slide in in the state of use of the structural sliding bearing. Together, several of such structural sliding bearings form a structural bearing system with a correspondingly large number of connection points between the respective structure parts.

Such structural sliding bearings or structural bearing systems for connecting a wide variety of structure parts are, in principle, sufficiently known from the state of the art.

Structural sliding bearings generally transmit vertical and horizontal loads and allow rotation as well as relative displacements where this is required. Structural sliding bearings are thus a special type of structural sliding bearing that are generally used for the defined and, as far as possible, constraint-free support of any type of structure, such as bridges, in particular for road and rail traffic, girders and buildings of any type or parts thereof. They thus allow relative movements between two parts of the structure in question, which may be caused, for example, by the use of the structure or also by any external influences such as wind or an earthquake. With the use of such structural sliding bearings or corresponding structural bearing systems, damage to the corresponding structures can thus be avoided in particular.

According to the DIN EN 1337 standard, various designs and modes of operation of structural sliding bearings are known. Depending on the design and mode of operation, they have a different structure and a different number of degrees of freedom. Thus, structural sliding bearings can be designed either as bearings that are fixed on all sides or bearings that can be displaced to all sides or to one side. According to the DIN 4141-13 standard, there are also solutions in which locking devices are used to convert a guided bearing into a fixed bearing. The present invention relates in particular to uniaxially guided or unidirectionally displaceable structural sliding bearings, in which a displacement movement of the sliding plate along a specific axial direction of the primary sliding surface is thus made possible. Fixed bearings which are subsequently converted are also relevant to the present invention. Such uniaxially guided structural sliding bearings can be realized, for example, as pot bearings or also spherical bearings. Both types of structural sliding bearings are shown schematically in FIGS. 1 and 2 and are explained briefly below.

FIG. 1 shows a uniaxially guided structural sliding bearing in the form of a pot bearing 10, also called a pot sliding bearing, as known from the prior art. As can be seen from the figure, the pot sliding bearing 10 has a pot 12 as a bearing base that can be connected to a first part of the structure. The pot 12 includes a machined recess 14 for receiving an elastomeric pad 16, an inner seal 18, and a pot lid 20 that is the intermediate bearing part of the pot sliding bearing 10. The pot lid 20 closes the opening of the pot 12 and rests flush on the elastomeric pad 16 disposed thereunder. Above the pot lid 20, the sliding plate 22 is arranged to be connected to a second structure part. Both the pot lid 20 and the sliding plate 22 are oriented horizontally, so that a horizontal primary sliding surface 24 of the pot sliding bearing 10 extends between these two components. To this end, a sliding material 26 is disposed on the pot lid 20 to reduce friction between the pot lid 20 and the sliding plate 22. This results in sliding the sliding plate 22 along the primary sliding surface 24 with as little resistance as possible.

The pot sliding bearing 10 can thus absorb vertically induced forces or loads via the sliding plate 22, the horizontal primary sliding surface 24, the pot lid 20 and the elastomeric pad 16 and transfer them to the pot 12 below. At the same time, the elastomeric pad 16 allows any rotation of the pot sliding bearing 10. This happens through punctual yielding of the elastomeric pad 16 in the area of the induced force by the pot lid 20. The inner seal 18 is arranged in such a way that pressing out of the elastomeric pad 16 through the gap between the pot wall and the pot lid 20 can be prevented as soon as a compressive load occurs on the elastomeric pad 16. Furthermore, an outer seal may be arranged between the pot lid 20 and the pot 12 to keep moisture and dirt away from the corresponding gap.

Furthermore, the pot sliding bearing 10 has a central guiding rail 28 to realize the uniaxial displaceability of the sliding plate 22. The central guiding rail 28 is arranged above the pot lid 20 in the area of the primary sliding surface 24 and engages with a corresponding groove of the sliding plate 22. Thus, the guiding rail 28 defines the axis of movement of the pot sliding bearing 10 in that it can absorb all horizontal forces transverse to the sliding direction. The two sliding surfaces between the guiding rail 28 and the sliding plate 22 are arranged vertically along the axis of movement. Thus, horizontally acting forces are applied to the central guiding rail 28 perpendicularly from both sides and can thus be effectively absorbed. The guiding rail 28 also has a sliding material 30 along both vertical sliding surfaces, which is initially lubricated. Friction between the guiding rail 28 and the sliding plate 22 is thus reduced and movement of the sliding plate 22 along the axis of movement is facilitated.

Thus, if horizontal forces act on the pot sliding bearing 10 which run parallel to the guiding rail 28, the sliding plate 22 shifts relative to the pot lid 20 below. These force components are thus not absorbed and transmitted by the pot sliding bearing 10. Corresponding movements of the structure parts can thus be compensated.

The situation is different for horizontal forces acting transverse to the guiding rail 28. The sliding plate 22 cannot execute any horizontal movements transverse to the guiding rail 28. Therefore, such directed forces are absorbed and transmitted by the guiding rail 28 or the pot sliding bearing 10. Corresponding movements of the structure parts can therefore not be compensated.

In addition to the design shown in FIG. 1, there are also solutions in which the guiding rail is formed on the sliding plate and the groove is in turn formed on the pot lid. The basic functional principle discussed above with regard to the degrees of freedom and the force transfer between the pot lid and the sliding plate applies here accordingly.

FIG. 2 illustrates a uniaxially guided structural sliding bearing in the form of a spherical bearing 110, as known in the prior art. The spherical bearing 110 includes a bearing base 112 that is connectable to a first structure part. Further, the spherical bearing 110 includes a calotte 114 that is the intermediate bearing part of the spherical bearing 110. The calotte 114 is convexly curved downwardly and is received in a correspondingly concave portion at the top of the bearing base 112. A secondary sliding surface 116 or secondary sliding surface of the spherical bearing 110 is thus formed between the calotte 114 and the bearing base 112. A sliding material 118 is disposed in the area of the secondary sliding surface 116 to allow the calotte 114 to move within the concave portion of the bearing base 112 with as little resistance as possible. Above the calotte rests the sliding plate 120, which can be connected to a second structure part. Thus, the main horizontal sliding surface 122 or primary sliding surface of the spherical bearing 110 is located between the calotte 114 and the sliding plate 120. A sliding material 124 is disposed on the calotte 114 in the area of the primary sliding surface 122 to reduce friction between the calotte 114 and the sliding plate 120. As a result, sliding of the sliding plate 24 along the primary sliding surface 122 with as little resistance as possible is also achieved here.

The spherical bearing 110 can thus absorb vertically acting forces or loads via the sliding plate 120, the horizontal primary sliding surface 122 and the calotte 114 and transmit them to the bearing base 112. At the same time, the convex curvature of the calotte 114 and the receiving concave portion of the bearing base 112 allow corresponding rotations of the calotte 114 or the spherical bearing 110. This occurs here by sliding of the calotte 114 along the secondary sliding surface 116.

In this embodiment, the uniaxial guidance of the spherical bearing 110 is implemented by two horizontal lateral guiding rails 126. These are each arranged adjacent to the primary sliding surface 122 on the side of the bearing base 112 in order to engage with the sliding plate 120. Thus, any horizontal forces transverse to the two lateral guiding rails 126 are also absorbed here, thereby defining the axis of movement of the spherical bearing 110. Here, as in the case of the pot sliding bearing 10, the sliding surfaces between the two lateral guiding rails 126 and the sliding plate 120 are each formed vertically along the axis of movement. Due to the vertical action of the horizontal forces on the sliding surfaces of the two guiding rails 126, higher force effects can also be effectively absorbed. Similarly, the two lateral guiding rails 126 have a sliding material 128 in the area of the vertical sliding surfaces, which is initially lubricated. The friction between the two guiding rails 126 and the sliding plate 120 can thus be considerably reduced, which facilitates the movement of the sliding plate 120 along the axis of movement accordingly.

As soon as horizontal forces act on the spherical bearing 110 parallel to the two lateral guiding rails 126, the sliding plate 120 shifts relative to the underlying spherical bearing 110. These horizontal forces are thus not absorbed and transmitted by the spherical bearing 110. Corresponding movements of the structure parts can thus be compensated.

The opposite happens with horizontal forces acting transverse to the two lateral guiding rails 126. The sliding plate 120 cannot execute corresponding horizontal movements in this direction. Thus, such horizontally directed forces are absorbed by the two lateral guiding rails 126 or transmitted directly from the sliding plate 120 to the bearing base 112. Horizontal forces that run transversely to the two lateral guiding rails 126 are therefore absorbed by the spherical bearing 110. Corresponding movements of the structure parts can therefore not be compensated.

In the described forms of uniaxially guided structural sliding bearings, there is thus a functional separation between vertical and horizontal force transfer. While the vertical loads are absorbed by the respective primary sliding surface of the intermediate bearing part, horizontal forces acting transversely to the axis of movement are transmitted to the corresponding guiding rails. As stipulated in the DIN EN 1337-2:2004 standard for bearings in the construction industry under item 6.8, the known structural sliding bearings are dimensioned in such a way that no gap occurs in the area of the primary horizontal sliding surface in a state of use. In this disclosure, a gap is understood to be a partial lift-off within the sliding surface. Thus, an overall gap is decisive for the load-bearing capacity of the structural sliding bearing.

According to the standard DIN EN 1990:2010-12 for the fundamentals of structural design, the state of use extends up to and including the serviceability limit state. If the serviceability limit state is exceeded, the specified conditions for the state of use of a structure or a component are no longer fulfilled. Thus, limit states that affect the function of the structure or one of its parts under normal conditions of use or the well-being of the users or the appearance of the structure are also to be classified as serviceability limit states.

In the case of special structural sliding bearings or structural bearing systems designed for extreme cases such as an earthquake, the state of use can therefore still be present when the extreme case occurs. This also applies in particular to the condition after the triggering of any emergency and buffer functions that are only used in extreme cases. Here, for example, a targeted lifting of the sliding plate from the intermediate bearing part is provided within the state of use.

Although any orientations of surfaces, axes and forces are described herein as horizontal or vertical for simplicity, they are not limited with respect to a horizontal or vertical plane or direction in the strict sense. In the present disclosure, such indications of orientation refer only to the plane of motion of the structural sliding bearing or structural bearing system. This is particularly applicable when the structural sliding bearing or the structural bearing system is installed at an angle, for example. Thus, in this case, the orientation of the horizontal primary sliding surface may differ from a horizontal plane in the narrower sense and, accordingly, may also be inclined. The same applies to the vertical guiding surfaces arranged perpendicularly thereto and correspondingly described force effects.

Despite this proven principle of force transfer, it has been found that large quantities of dust, dirt or other foreign bodies can accumulate in the area of the rail structures, especially during long-term use of such structural sliding bearings. If regular maintenance of the structural sliding bearings is not carried out, this can lead to increased wear of the sliding material or to impairments in the sliding behavior of the structural sliding bearing. This is primarily due to the fact that in such rail structures there is a certain amount of play between the respective components, which cannot be avoided in principle—here in particular in the area of the vertical sliding surfaces between the guiding rail and the sliding plate. Thus, there is normally a gap in the area of the vertical guiding surfaces when the structural sliding bearing is in the state of use. This play or gap also causes edge compression in the area of the guiding surfaces. The result is uneven force transmission within the structural sliding bearing, which can lead to increased and uneven wear of the sliding material. In addition, the guiding surfaces of the rail structure can only be lubricated initially due to the play, and a permanent supply of lubricant is not guaranteed. In addition, a sliding material must be used that can absorb high local compression. Thus, sliding materials are ultimately used here that exhibit relatively poor sliding behavior due to relatively high coefficients of friction and relatively high wear.

In particular, uniaxially structural sliding bearings with a central guiding rail can only be used to a limited extent to support very high forces. When using two lateral guiding rails, on the other hand, the rotation of the bearing about the vertical axis is impeded. Ultimately, the described structural sliding bearings represent complex structures that require a correspondingly high level of effort in terms of installation space and the costs of manufacture and maintenance. The same disadvantages affect structural bearing systems that feature such structural sliding bearings.

It is thus the task of the present invention to provide an improved structural sliding bearing and structural bearing system which, on the one hand, is as simple as possible in design and, on the other hand, operates as long as possible without maintenance and reliably even when subjected to increased forces, so that costs and effort can be reduced during manufacture and during use.

According to the invention, the solution to the aforementioned problem is achieved with a structural sliding bearing according to claim 1 and a structural bearing system according to claim 21. Advantageous further embodiments of the invention result from dependent claims 2 to 20 and dependent claims 22 to 36.

The structural sliding bearing according to the invention is thus characterized in that the primary sliding surface has at least two partial sliding surfaces, each of which is arranged in mutually angled sliding planes, the sliding planes meeting in a common line of intersection which forms an axis of movement of the structural sliding bearing along which the sliding plate can move. Further, the two sliding planes include a first angle, the first angle being selected such that no gap occurs in the area of the primary sliding surface in the state of use of the structural sliding bearing. In other words, a structural sliding bearing is provided without a gap in all of the sliding surfaces.

The two sliding surfaces angled relative to one another of the primary sliding surface combine the functions of vertical and horizontal force transfer within the structural sliding bearing. Any vertical forces as well as horizontal forces acting transversely to the axis of movement can now be absorbed by the primary sliding surface of the structural sliding bearing. The rail structures previously used in the center or on the sides are thus no longer required, as their functions are fully performed by the primary sliding surface. As a result, the structure of the structural sliding bearing is considerably simplified and corresponding manufacturing costs can be reduced. The installation space, which is in part only available to a limited extent, can also be significantly reduced. This applies not only to the omission of the rail structures but also to the corresponding design of the sliding plate. Any sections or recesses for engagement with a rail structure are no longer necessary in or on the sliding plate, which means that the dimensions and in particular the thickness of the sliding plate can be reduced. The omission of the rail structures also eliminates the potential for dirt and foreign bodies to enter this area due to a lateral play of movement.

The ratio between the maximum possible vertical force and horizontal force of the structural sliding bearing can be optimally adjusted via the inclination of the two partial sliding surfaces relative to each other or the selection of the first angle. With the appropriate selection of the inclination of the two partial sliding surfaces to one another, a gap in the area of the primary sliding surface can thus be avoided in the state of use of the structural sliding bearing, even with maximum horizontal force in combination with the corresponding minimum vertical force. If, for example, the structural sliding bearing is to be designed for higher horizontal loads, the two inclined partial sliding surfaces are designed to be so steep in relation to the acting horizontal forces that lifting of the sliding plate from the intermediate bearing part does not occur in the state of use of the structural sliding bearing. At the same time, a sliding material with the lowest possible friction can be used in the area of the primary sliding surface to nevertheless facilitate the movement of the sliding plate in the direction of the axis of movement.

Due to the continuous and uniform compression in the area of the primary sliding surface, permanently lubricated sliding materials, such as those known from the DIN EN 1337-2:2004 standard for bearings in the construction industry, are now also suitable for guidance. These have a low coefficient of friction and are particularly low-wear. In tests carried out by the applicant, it has already been possible to establish resistance with corresponding sliding materials at a cumulative sliding distance in the present guiding primary sliding surface that is up to 25 times higher than in the previously separate initially lubricated guiding surfaces.

In addition, the two partial sliding surfaces, which are angled relative to one another, enable continuous self-centering of the sliding plate on the intermediate bearing part of the structural sliding bearing in relation to the axis of movement. The sliding plate is thus optimally positioned relative to the intermediate bearing part at all times and possible edge pressures along the axis of movement can be avoided. Bearing play due to any guiding rails is simply no longer present.

Preferably, the primary sliding surface has exactly two, most preferably only two, partial sliding surfaces. In this way, the structural sliding bearing according to the invention is as simple as possible. The two inclined partial sliding surfaces can, for example, form a continuous primary sliding surface which is only bent once in the area of the axis of movement. Here, in addition to the mutually angled sliding planes, the two mutually inclined partial sliding surfaces thus also intersect along the axis of movement. Alternatively, the two inclined partial sliding surfaces can also be formed separately from each other in the respective sliding planes.

Preferably, the structural sliding bearing is a uniaxially guided structural sliding bearing in which the sliding plate can only move along the axis of movement relative to the intermediate bearing part. This ensures that the structural sliding bearing does not permit any further movements of the sliding plate than those along the axis of movement relative to the intermediate bearing part. The structural sliding bearing can thus be used specifically when horizontal movements in a single direction are to be permitted.

Preferably, the two sliding planes are arranged so that the line of intersection runs horizontally. This means that the axis of movement of the structural sliding bearing is also horizontal. With this configuration, the structural sliding bearing is loaded as uniformly as possible in terms of force transfer. Furthermore, the sliding plate can move uniformly with identical resistance in both directions of the axis of movement. As explained above, the horizontal alignment is to be understood with reference to the plane of movement of the structural sliding bearing. Thus, the line of intersection can also have a different orientation than a horizontal line in the narrower sense.

Advantageously, the first angle is selected in such a way that in the ultimate limit state of the structural sliding bearing no gap occurs in the area of the primary sliding surface. If, starting from the state of use, the loads on the structural sliding bearing are increased further, the ultimate limit state occurs. According to the DIN EN 1990:2010-12 standard for fundamentals of structural design, this state is related to collapse or other forms of structural failure. Thus, those limit states that affect the safety of people and/or the safety of the structure are also to be classified as ultimate limit states. This has the advantage that even in this state it is still ensured that no gap occurs in the area of the primary sliding surface or that the sliding plate does not lift off the intermediate bearing part.

Advantageously, the primary sliding surface has a permanently lubricated sliding material, preferably with PTFE, UHMWPE, POM and/or PA. Due to the permanently lubricated sliding material in the area of the primary sliding surface, the friction between the sliding plate and the intermediate bearing part can be significantly reduced. Due to the at least two partial sliding surfaces angled relative to one another, a sliding material with a low coefficient of friction can be used here. High horizontal forces can already be absorbed by a corresponding inclination of the inclined partial sliding surfaces. This facilitates sliding of the sliding plate along the axis of movement. Preferably, the sliding material has a coefficient of friction of no more than 0.03 for the rated value of the compression in the sliding material.

Advantageously, the sliding material has at least one lubricated sliding disc, which preferably has at least one lubrication pocket. The prefabricated lubrication pockets can store the lubricant and distribute it evenly over the sliding surface. This results in a particularly low-wear sliding material with a low coefficient of friction. This facilitates the sliding movement of the sliding plate along the axis of movement and extends the maintenance intervals of the structural sliding bearing.

Preferably, at least two partial sliding surfaces angled towards each other are arranged in such a way that the corresponding sliding planes form the shape of a pitched roof. The pitched roof is designed in such a way that the line of intersection or the axis of movement forms the ridge of the pitched roof. The shape of a pitched roof has the particular advantage that any accumulation of dirt and foreign bodies in the area of the at least two partial sliding surfaces inclined to each other can be avoided as far as possible. This applies in particular in the area of the movement axis, since this represents the uppermost point of the pitched roof as the roof ridge.

Preferably, at least two partial sliding surfaces angled relative to one another are arranged in such a way that the corresponding sliding planes form the shape of an upside-down pitched roof. Here, too, the pitched roof is designed in such a way that the line of intersection or the axis of movement forms the ridge of the pitched roof. Due to the upside-down roof shape, it is possible to make the sliding plate stronger in the center, which is subjected to the highest loads, than at the edge without requiring further installation space in the vertical direction. Thus, despite increased loads, installation space can again be saved.

Furthermore, at least two partial sliding surfaces angled towards one another can be formed symmetrically with respect to each other in relation to a symmetry plane running through the line of intersection in the vertical direction. The symmetrical arrangement of the at least two mutually inclined partial sliding surfaces results in improved self-centering of the sliding plate on the intermediate bearing part. In addition, it is advantageous, particularly in the case of balanced force application from all sides, if the conditions for displacement of the sliding plate in both directions along the axis of movement are as equal as possible. In addition, the structural sliding bearing is simple in design and thus cost-effective to manufacture. As explained further above, the vertical direction is to be understood with reference to the plane of movement of the building sliding bearing. Thus, the vertical direction can also have a different orientation than a vertical in the narrower sense.

Preferably, at least two sliding surfaces angled relative to one another of the primary sliding surface are of different sizes. This design is particularly advantageous when horizontal forces of different magnitudes act on the structural sliding bearing from different directions. Thus, the structural sliding bearing according to the invention can be specially designed to be able to absorb greater acting forces from a certain horizontal direction transverse to the axis of movement than from a direction opposite thereto. This can ensure that a gap does not occur or that the sliding plate lifts off even if the force applied is uneven. Alternatively or additionally, the two opening angles between the symmetry plane and the respective inclined partial sliding surface could also be of different sizes.

Advantageously, at least one sliding plane is inclined downwardly relative to the horizontal by a second angle between 0 degrees and 10 degrees, preferably by 6 degrees. With a steeper second angle, correspondingly higher horizontal forces transverse to the axis of movement can be absorbed by the respective inclined partial sliding surface. At the same time, it is still possible to use a sliding material with a low coefficient of friction in the area of the primary sliding surface. On the one hand, this prevents a gap or even lifting of the sliding plate from the intermediate bearing part. On the other hand, it ensures that the sliding plate moves along the axis of movement with as little resistance as possible. As explained further above, the horizontal is to be understood with reference to the plane of movement of the structural sliding bearing. Thus, the horizontal can also have a different orientation than a horizontal plane in the narrower sense. Particularly preferably, the second angle corresponds at least to the friction to be permissibly applied for the design.

Furthermore, the first angle can be between 160 degrees and 180 degrees, preferably at 168 degrees. With a more acute first angle, correspondingly higher horizontal forces can be absorbed transverse to the axis of movement by the respective inclined partial sliding surface. At the same time, it is still possible to use a sliding material with a low coefficient of friction in the area of the primary sliding surface. On the one hand, this prevents a gap or even lifting of the sliding plate from the intermediate bearing part. On the other hand, it ensures that the sliding plate moves along the axis of movement with as little resistance as possible.

Preferably, the sliding plate is multi-part and the distance between the corresponding sliding plate parts is adjustable. With this arrangement of the structural sliding bearing according to the invention, a simple height adjustment is provided. In particular, it is made possible to adjust the distance between the sliding plate or sliding plate parts and the bearing base. Accordingly, the distance between the two structure parts is thus also changed. Advantageously, the sliding plate is divided into two sliding plate parts. In this simplest case, one sliding plate part is arranged along each of the two mutually inclined partial sliding surfaces. If the two sliding plate parts are now pushed synchronously towards or away from each other along the corresponding sliding planes transverse to the axis of movement, the horizontal distance between the two sliding plate parts and the bearing base of the structural sliding bearing also changes. If, on the other hand, only one of the two sliding plate parts is displaced in this way, for example, or if both sliding plate parts are displaced out of synchronization, the second structure part is tilted in its position relative to the first structure part.

The structural sliding bearing is also designed as a pot bearing, in which the intermediate bearing part has a pot lid and the bearing base has a pot together with an elastomeric pad. By means of the pot lid and the elastomeric pad underneath, vertically acting forces can be effectively transmitted from the sliding plate to the pot. At the same time, torsion between the sliding plate and the pot is made possible.

Alternatively, the structural sliding bearing is designed as a spherical bearing in which the intermediate bearing part has a calotte. The calotte has a convex portion and the bearing base has a corresponding concave portion, with the convex portion of the calotte being arranged to slide in the concave portion of the bearing base. Again, by means of the calotte, forces acting vertically are effectively transmitted from the sliding plate to the bearing base. Likewise, torsion between the sliding plate and the bearing base is made possible. In combination with the design of the at least two partial sliding surfaces inclined to each other in the form of an upside-down pitched roof, it is also achieved that the eccentricities from acting horizontal forces are significantly reduced. At the same time, the sliding plate is thicker at the center, which is subject to the highest stresses, than at the edge. This means that the entire sliding plate can be thinner and thus produced more economically.

Preferably, the concave portion of the bearing base has a recess at a lower pole, so that in the area of the recess the convex portion of the calotte does not come into contact with the concave portion of the bearing base. The lower pole is understood to be the lowest point of the concave portion of the bearing base. The recess at the lower pole increases the radius of inertia and, while the outer diameter remains the same, increases the pressure by reducing the pressure area so that the friction and thus the resistance to torsion, i.e. the acting torque, is reduced. This reduces the risk of gaping. Accordingly, the counteracting compression from the acting vertical load increases compared to the compression from the lifting horizontal force. This ratio can be controlled by the diameter of the recess. Thus, on the one hand, even greater forces can be absorbed by the structural sliding bearing—even without increasing the primary sliding surface. On the other hand, the structural sliding bearing can be individually adjusted and designed in combination with the least two mutually inclined partial sliding surfaces of the primary sliding surface. Thus, both the choice of the first angle and the choice of the diameter of the recess offer a possibility to adjust the ratio of the absorbable vertical forces and horizontal forces.

Preferably, the recess is circularly centered on the lower pole. Due to this arrangement, a uniform influence of the absorbable vertical forces and horizontal forces from different directions of action is achieved. Likewise, any forces acting on the bearing are transmitted evenly from the calotte to the lower part of the bearing. It would also be conceivable to have a recess in elliptical form with the corresponding displacement of uniform force transfer.

Advantageously, a sliding material, preferably a polymer sliding disk, is arranged on the concave portion of the lower part of the bearing, and the recess is formed in the sliding material. The sliding material or the polymer sliding disk can reduce the friction in the area of the secondary sliding surface of the spherical bearing. For this purpose, the sliding material is basically in contact with the convex portion of the calotte. Thus, the recess in the sliding material avoids such contact in this area with the calotte in order to achieve the advantages already discussed. Furthermore, the recess in the sliding material is also easy to manufacture. For example, an annular polymer sliding washer can be used, which is attached to the concave portion of the bearing base in the area of the secondary sliding surface.

Advantageously, the structural sliding bearing further comprises at least one abutment between the sliding plate and the bearing base. The abutment may be configured in any way to limit movement of the sliding plate relative to the bearing base to a predetermined extent. Thus, the structural sliding bearing can also be converted into a fixed bearing. On the one hand, such a bearing has no play in movement transversely to the mutually inclined partial sliding surfaces. On the other hand, it exhibits low torsional resistance.

The structural bearing system according to the invention comprises at least two sliding bearings for connecting at least two structure parts. Each sliding bearing comprises a bearing base connectable to a first structure part, a sliding plate connectable to a second structure part, and an intermediate bearing part arranged between the bearing base and the sliding plate. At least one main planar sliding surface of the sliding bearing is disposed between the intermediate bearing member and the sliding plate. Further, the structural bearing system is characterized in that the two sliding bearings form a pair of bearings in which the primary sliding surface of the first sliding bearing is arranged in a first sliding plane angled with respect to the horizontal and the primary sliding surface of the second sliding bearing is arranged in a second sliding plane angled with respect to the horizontal. The sliding planes meet in a common line of intersection which forms an axis of movement of the pair of bearings along which the sliding plates can move.

The previously described advantages of the structural sliding bearing according to the invention are achieved here with a corresponding structural bearing system. The two primary sliding surfaces of the first sliding bearing and the second sliding bearing, which are inclined to each other, achieve a functional unification of vertical and horizontal force transfer within the pair of bearings and thus also of the entire structural bearing system. Thus, any vertical forces as well as horizontal forces acting transversely to the axis of movement can now be absorbed by the primary sliding surfaces of the first sliding bearing and the second sliding bearing. While the first sliding bearing can absorb horizontal forces from only one specific direction transverse to the axis of movement, the horizontal forces from the opposite direction are absorbed by the second sliding bearing. Both sliding bearings thus complement each other to enable the functions and advantages of the previously described structural sliding bearing as a structural bearing system.

Consequently, any rail structures mounted centrally or laterally are no longer required here either, since the horizontal force transfer is completely fulfilled by the inclined primary sliding surfaces of both sliding bearings. This considerably simplifies the design of the individual sliding bearings and consequently of the corresponding structural bearing system. Corresponding manufacturing costs can be significantly reduced. The installation space, which is in part only available to a limited extent, can also be reduced. This applies not only to the rail structures but also to the complementary sliding plates. Any sections or recesses for engagement with a guiding rail are no longer necessary in or on the sliding plate. The dimensions and in particular the thickness of the sliding plate can thus be significantly reduced. Similarly, the omission of the rail structures also eliminates the potential entry of dirt and foreign bodies in this area due to a lateral play of movement. Ultimately, permanently lubricated sliding materials with significantly less friction and wear can also be used here for the guide surfaces.

In addition, the two inclined primary sliding surfaces succeed in continuously self-centering the system consisting of the two sliding plates and the connected structure relative to the axis of movement defined by the two sliding bearings. This system is thus optimally positioned at all times relative to the intermediate bearing parts of the two sliding bearings, and possible edge pressures along the axis of movement can be avoided. In addition, bearing play due to guiding rails used is no longer present. Such an arrangement is therefore particularly advantageous in the construction of bridges for high-speed train lines. Here, it is essential to avoid a corresponding lateral offset.

With the two separate sliding plates of the two sliding bearings, a simple height adjustment is further provided. In particular, it is possible to adjust the distance between the two sliding plates and the respective bearing base parts. Accordingly, the distance between the two structure parts is also changed. If the two sliding plates are pushed synchronously towards or away from each other along the corresponding sliding planes transverse to the axis of movement, the horizontal distance between the two sliding plates and the respective bearing bases of the two sliding bearings also changes. If, on the other hand, only one of the two sliding plates is displaced in this way, for example, or if there is also a non-synchronous displacement of both sliding plates, the second structure part is tilted in its position relative to the first structure part. Alternatively, the two sliding plates can also be formed in one piece.

As already explained above, the horizontal is to be understood with reference to the plane of movement of the structural bearing system. Thus, the horizontal can also have a different orientation than a horizontal plane in the narrower sense.

Advantageously, the at least two sliding bearings are designed as sliding and tilting bearings. Conceivable, for example, would be spherical bearings, which bring with them the advantages described above. Alternatively, the at least two sliding bearings can be designed as elastomer bearings. In addition to their sliding properties, these also have deformation properties in the intermediate bearing part, whereby rotation and point loads can be compensated particularly effectively.

Advantageously the first sliding plane and the second sliding plane enclose a first angle, the first angle being selected such that no gap occurs in the area of the primary sliding surfaces when the structural bearing system is in the state of use. The ratio between the maximum possible vertical force and horizontal force that can be absorbed by the structural bearing system can be set via the inclination of the two primary sliding surfaces relative to one another or the selection of the first angle. This can be done without having to adjust the dimensions of the individual primary sliding surfaces. With the appropriate selection of the inclination of the two primary sliding surfaces relative to each other, a gap in the area of the primary sliding surfaces can thus be avoided even with maximum horizontal force in combination with the corresponding minimum vertical force in the state of use of the structural bearing system is in use. If, for example, the structural bearing system is to be designed for higher horizontal loads, the two inclined primary sliding surfaces are designed to be so steeply inclined against the respective horizontal force acting on them that a gap or even lifting of the sliding plates from the respective intermediate bearing parts does not occur in the state of use of the structural bearing system. At the same time, a sliding material with the lowest possible friction can be used in the area of the primary sliding surfaces in order to nevertheless facilitate the movement of the sliding plates in the direction of the axis of movement as much as possible.

Preferably, the pair of bearings is a uniaxially guided pair of bearings in which the sliding plates can only move along the axis of movement relative to the intermediate bearing parts. This ensures that the structural bearing system does not permit any further movements of the sliding plates than those along the axis of movement relative to the intermediate bearing parts. The structural bearing system can thus be used specifically when horizontal movements in a single direction are to be permitted.

Preferably, the first sliding plane and the second sliding plane are arranged so that the line of intersection runs horizontally. Thus, the axis of movement of the pair of bearings also runs horizontally. With this configuration, the pair of bearings is uniformly loaded in terms of force transfer. Furthermore, the sliding plates can move uniformly with identical resistance in both directions of the axis of movement. As explained earlier, the horizontal orientation is to be understood with reference to the plane of movement of the structural bearing system. Thus, the line of intersection can also have a different orientation than a horizontal line in the narrower sense.

Advantageously, the first angle is selected in such a way that in the ultimate limit state of the structural bearing system no gap occurs in the area of the primary sliding surfaces. If the loads on the structural bearing system are further increased from the state of use, the ultimate limit state occurs. According to the DIN EN 1990:2010-12 standard for fundamentals of structural design, this state is related to collapse or other forms of structural failure. Thus, those limit states that affect the safety of people and/or the safety of the structure are also to be classified as ultimate limit states. Thus, even in this state, it is ensured that no gap occurs in the area of the primary sliding surfaces or that the sliding plate does not lift off the intermediate bearing part.

Advantageously at least one primary sliding surface has a permanently lubricated sliding material, preferably with PTFE, UHMWPE, POM and/or PA. The permanently lubricated sliding material in the area of the primary sliding surface can significantly reduce the friction between the sliding plate and the intermediate bearing part. Due to the inclined primary sliding surfaces, a sliding material with a low coefficient of friction can be used here. High horizontal forces can already be absorbed by an appropriate inclination of the primary sliding surfaces. This facilitates sliding of the sliding plate along the axis of movement. Preferably, the sliding material has a coefficient of friction of no more than 0.03 for the rated value of the compression in the sliding material.

Preferably, the sliding material has at least one lubricated sliding disc, which preferably has at least one lubrication pocket. The prefabricated lubrication pockets can store the lubricant and distribute it evenly over the sliding surface. This results in a particularly low-wear sliding material with a low coefficient of friction. This facilitates the sliding movement of the corresponding sliding plate along the axis of movement and extends the maintenance intervals of the structural bearing system.

Advantageously at least two primary sliding surfaces angled towards each other are arranged in such a way that the corresponding sliding planes form the shape of a pitched roof. The pitched roof is designed in such a way that the line of intersection or the axis of movement forms the ridge of the pitched roof. The shape of a pitched roof has the particular advantage that any accumulation of dirt and foreign bodies in the area of the primary sliding surfaces can be avoided as far as possible. This applies in particular in the area of the movement axis in the case where the first and second sliding bearings are installed in the immediate vicinity, since the movement axis as the ridge of the roof represents the uppermost point of the pitched roof.

Advantageously, at least two primary sliding surfaces angled towards each other are arranged in such a way that the corresponding sliding planes form the shape of an upside-down pitched roof. Here, too, the pitched roof is designed in such a way that the line of intersection or the axis of movement forms the ridge of the pitched roof. Due to the upside-down roof shape, it is possible to make the respective sliding plate stronger at the end towards the axis of movement without requiring further installation space in the vertical direction. Thus, despite increased loads, installation space can again be saved.

Advantageously at least two primary sliding surfaces angled towards each other are formed symmetrically with respect to a plane of symmetry running through the line of intersection in the vertical direction. The arrangement according to the invention enables improved self-centering of the system consisting of both sliding plates and the connected structure relative to the axis of movement defined by the two sliding bearings. In addition, it is advantageous, particularly in the case of balanced force application from all sides, if the conditions for displacement of the respective sliding plate in both directions along the axis of movement are as equal as possible. In addition, the structural bearing system is simple in design and thus cost-effective to manufacture. As explained further above, the vertical direction is to be understood with reference to the plane of movement of the building bearing system. Thus, the vertical direction can also have a different orientation than a vertical in the narrower sense.

Preferably, at least two angled primary sliding surfaces are of different sizes. This design is particularly advantageous when horizontal forces of different magnitudes act on the structural bearing system from different directions. In this way, the structural bearing system according to the invention can be specially designed to be able to absorb greater acting forces from a specific horizontal direction transverse to the axis of movement than from a direction opposite thereto. In this way, the occurrence of a gap or even the lifting of the sliding plate can be ensured even in the case of uneven application of force.

Advantageously, at least one sliding plane is inclined downwardly relative to the horizontal by a second angle of between 0 degrees and 10 degrees, preferably 6 degrees. With a steeper second angle, correspondingly higher horizontal forces transverse to the axis of movement can be absorbed by the respective inclined primary sliding surfaces. At the same time, it is still possible to use a sliding material with a low coefficient of friction in the area of the primary sliding surfaces. On the one hand, this prevents a gap or even lifting of the sliding plate from the intermediate bearing part. On the other hand, it ensures that the sliding plate moves along the axis of movement with as little resistance as possible. As explained further above, the horizontal is to be understood with reference to the plane of movement of the structural bearing system. Thus, the horizontal can also have a different orientation than a horizontal plane in the narrower sense. Particularly preferably, the second angle corresponds at least to the friction to be permissibly applied for the design.

Preferably, the first angle is between 160 degrees and 180 degrees, preferably 168 degrees. With a more acute first angle, correspondingly higher horizontal forces transverse to the axis of movement can be absorbed by the respective inclined primary sliding surfaces. At the same time, it is still possible to use a sliding material with a low coefficient of friction in the area of the primary sliding surface. On the one hand, this prevents a gap or even lifting of the sliding plate from the intermediate bearing part. On the other hand, it ensures that the sliding plate moves along the axis of movement with as little resistance as possible.

Advantageously, the first sliding bearing and/or the second sliding bearing has a, preferably lateral, abutment device which limits a movement of the sliding plate relative to the bearing base. A rotation of the second structure part relative to the first structure part is thus counteracted. Preferably, the abutment device is designed such that a torque acting on the second structure part is supported about an axis parallel to the axis of movement. The abutment device can be designed, for example, as a one-piece abutment or as a multi-piece abutment. In one example, the abutment device is attached to the bearing base.

Advantageously, the abutment device is arranged on a side of the respective sliding bearing that faces or is inclined away from the axis of movement. This arrangement allows torques to be absorbed that act on the second structure part about an axis parallel to the axis of movement. Preferably, the abutment device is arranged on the side of the sliding bearing that is higher in the vertical direction. This has the advantage that, in the case of small or negligible torques, mainly the vertical force component of the dead weight acts on the bearing with respect to the operationally induced surcharge load. The abutment device is thereby completely free of forces. This significantly reduces wear on the abutment device and increases its life span.

Advantageously the abutment device has an adjustment device for adjusting a position of the abutment device. With the adjusting device, the abutment device can be optimally and precisely adjusted relative to the individual components of the sliding bearing depending on the situation. The adjusting device can be implemented, for example, via a screw connection. It is also conceivable that the adjustment device has an electric motor in order to adjust the position of the abutment device particularly precisely and/or automatically.

Preferably, the abutment device has a sliding device that guides the sliding plate in a direction parallel to the axis of movement. The sliding device enables the abutment device to continue to move the sliding plate relative to the bearing base along the axis of movement with as little friction as possible, despite its function of restricting movement towards or away from the axis of movement. In one embodiment, the sliding device is designed as a sliding strip.

Advantageously, the structural bearing system has at least two pairs of bearings and an axis. The pairs of bearings are arranged in succession along the axis, the primary sliding surfaces angled towards each other being arranged in such a way that the corresponding sliding planes of the pairs of bearings alternately form the shape of a pitched roof and the shape of an upside-down pitched roof along the axis. Preferably, the axis may be rectilinear in shape. A curved axis would also be conceivable, as may be the case, for example, with a roadway, a track, or a pipeline. The alternating arrangement of the primary sliding surfaces allows possible torsional torques of the structure to be absorbed in a targeted manner.

Preferably, the structural bearing system has at least two pairs of bearings and an axis. The pairs of bearings are arranged in succession along the axis, the primary sliding surfaces angled towards each other being arranged such that the corresponding sliding planes of the pairs of bearings alternately form the shape of a pitched roof and the shape of an upside-down pitched roof at every second pair of bearings along the axis. Preferably, the axis may be rectilinear in shape. A curved axis would also be conceivable, as may be the case, for example, with a roadway, a track or a pipeline. This principle can be applied in particular when several single span beams are supported one behind the other along the axis by the structural bearing system. Here, one end of each single span beam is held by a pair of bearings. In the connection points between the single span beams, a constant arrangement of the primary sliding surfaces of both pairs of bearings is used in each case. Thus, in the event of transverse expansion in the structure, a height offset in the joint between the two single span beams can be kept as small as possible. Preferably, the inclination of the primary sliding surfaces is also identical for two successive sliding bearings along the axis in the area of such a connection point. This can further reduce the risk of height misalignment.

The structural sliding bearing and structural bearing system according to the invention is thus as simple as possible in design and, at the same time, can operate for a long time without maintenance and reliably under increased forces. The costs and effort involved in the manufacture and during the operation of the structural sliding bearing and structural bearing system are thus reduced.

In the following, advantageous embodiments of the present invention will now be described schematically with reference to figures, wherein FIG. 1 shows a perspective view of a uniaxially guided pot bearing as known from the prior art and described in the introductory part of this disclosure;

Figure 1:
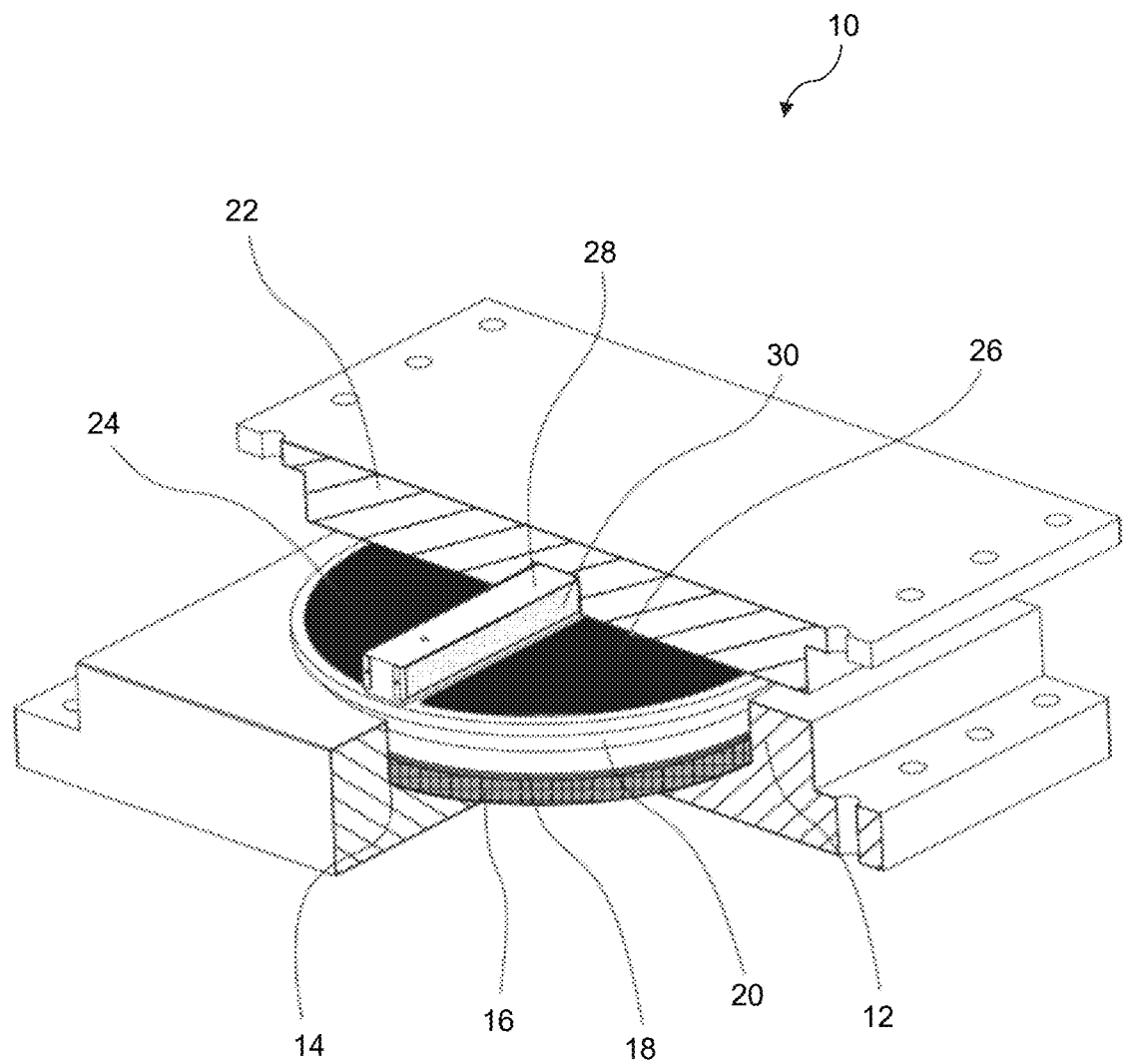
Figure 2:
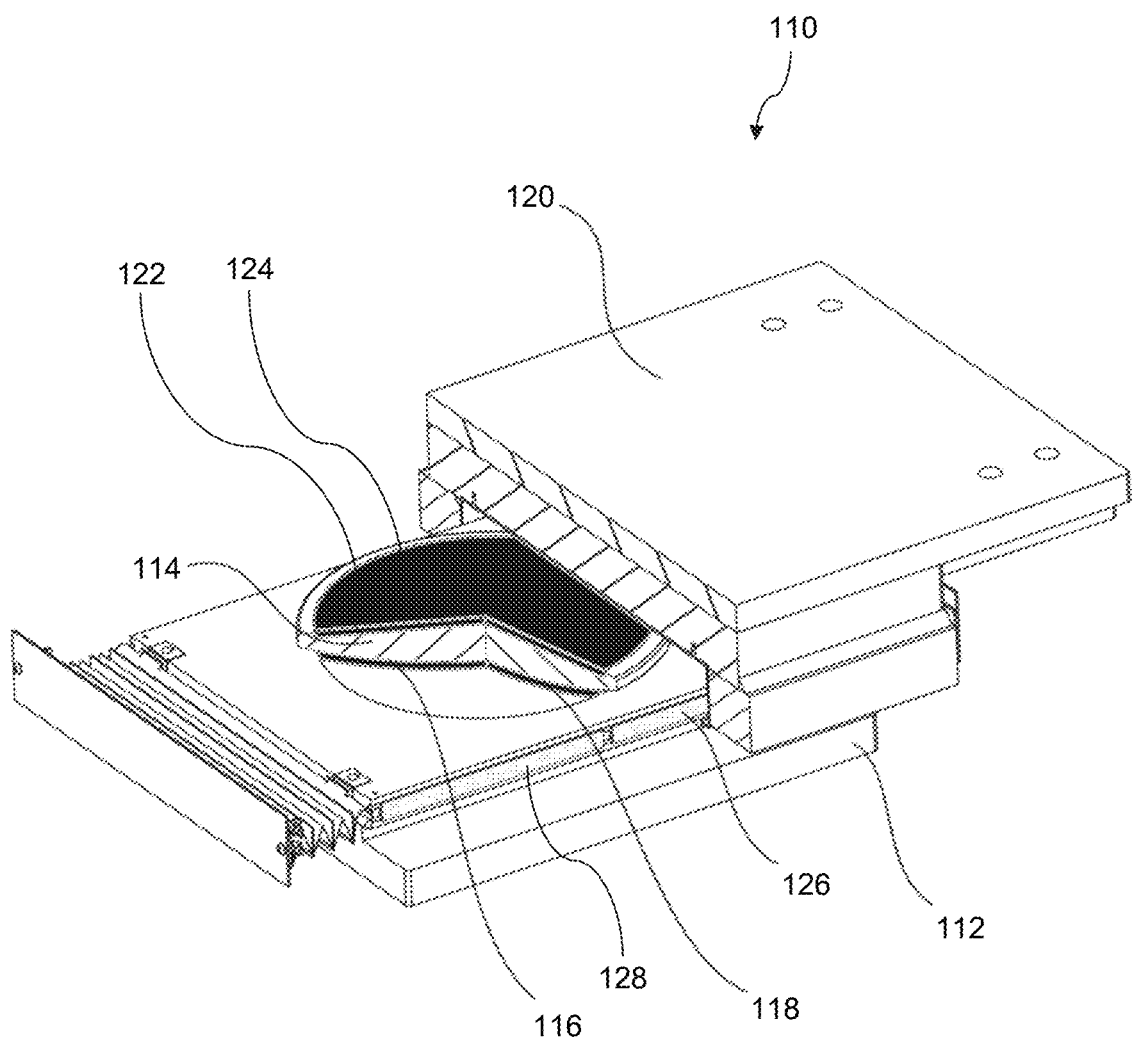
FIG. 2 shows a perspective view of a uniaxially guided spherical bearing as known from the prior art and described in the introductory part of this disclosure.
Figure 3:
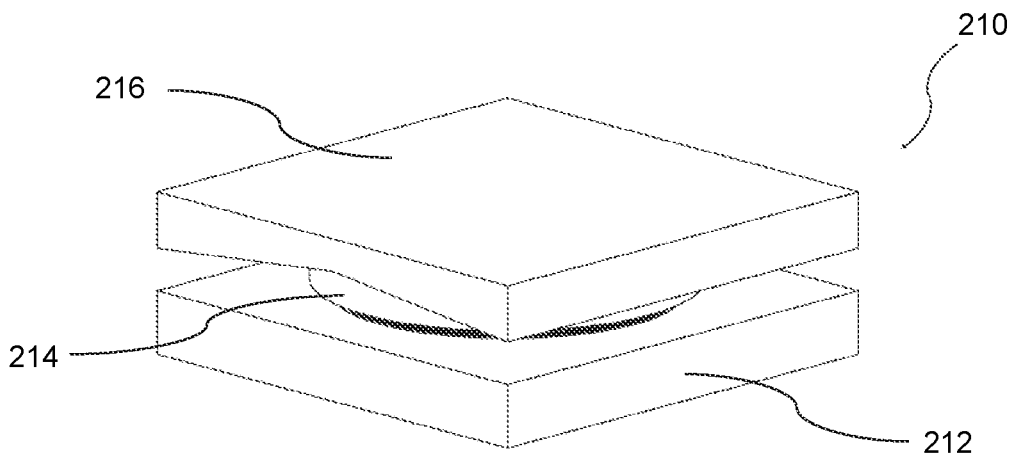
FIG. 3 shows a perspective view of a structural sliding bearing in the form of a spherical bearing according to a first embodiment.

Identical components in the various embodiments are marked with the same reference signs.

FIGS. 3 to 7 show the schematic structure of a structural sliding bearing 210 corresponding to a particularly advantageous first embodiment. The structural sliding bearing 210 is designed in the form of a uniaxially guided spherical bearing and, for force transmission, has a bearing base 212, which can be connected to a first structure part, a calotte as an intermediate bearing part 214 and a sliding plate 216, which can be connected to a second structure part.

The bearing base 212 includes a concave portion 218, in that the calotte is slidably received by its convex portion 220. Thus, between the convex portion 220 of the calotte and the concave portion 218 of the bearing base 212 is the secondary sliding surface 222 of the structural sliding bearing 210. In the area of the secondary sliding surface 222, a sliding material 224 in the form of a polymer sliding disc is arranged on the concave portion 218 of the bearing base 212. This can reduce friction between the convex portion 220 of the calotte and the concave portion 218 of the bearing base 212. Movement of the calotte relative to the bearing base 212 is thus facilitated, and the structural sliding bearing 210 allows rotation about the vertical and horizontal axes.

Figure 4:
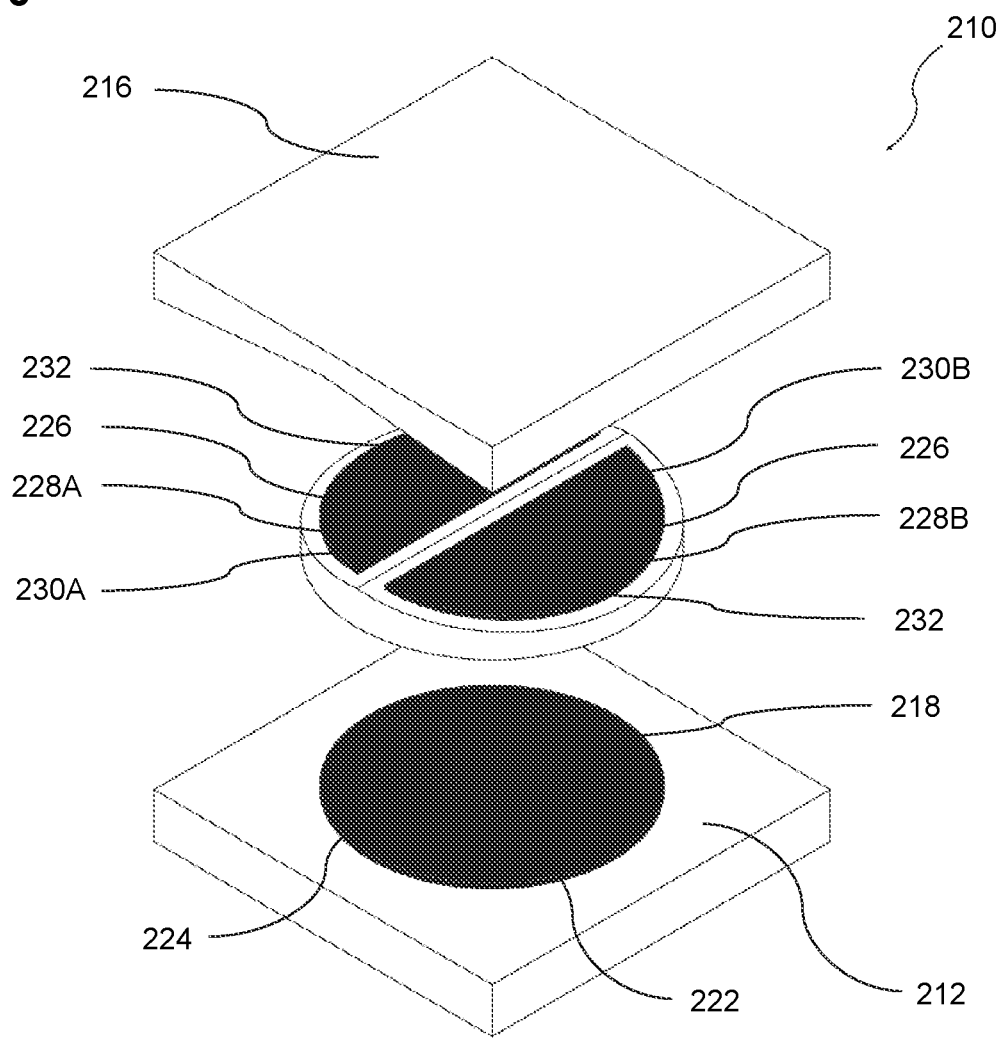
FIG. 4 shows an exploded view of the structural sliding bearing shown in FIG. 3.
Figure 5:
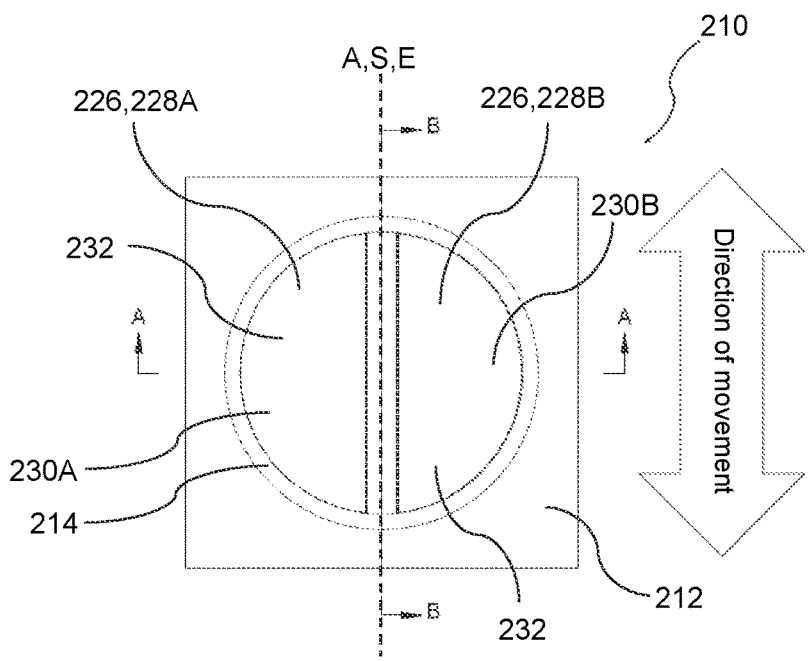
FIG. 5 shows a schematic top view of the structural sliding bearing shown in FIG. 3 with the sliding plate removed.
Figure 6:
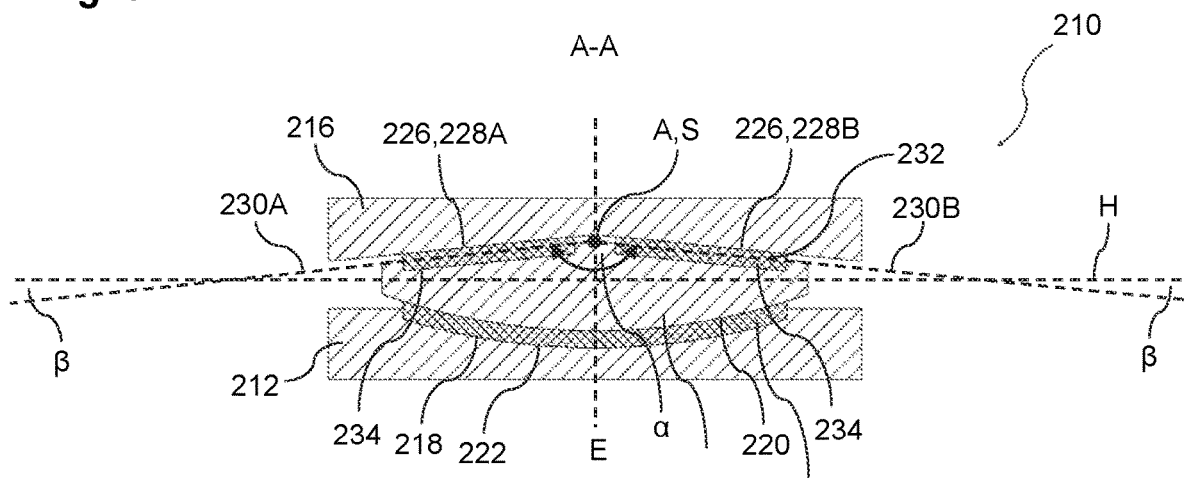
FIG. 6 shows a cross-section along line A-A shown in FIG. 5.
Figure 7:
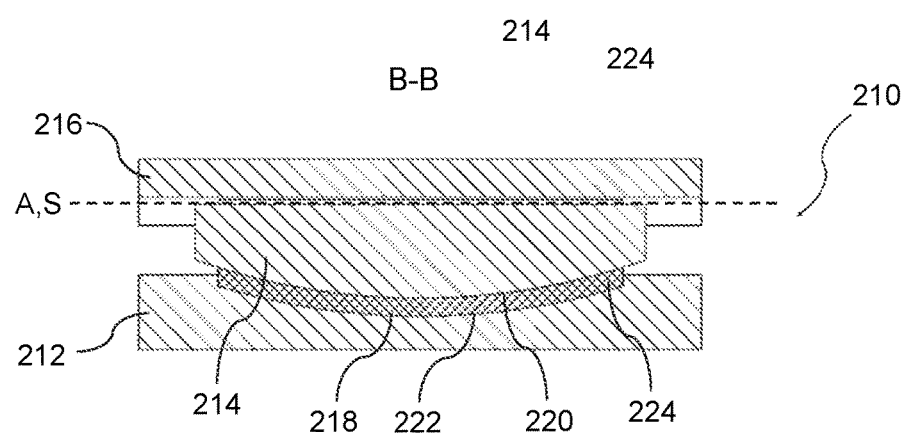
FIG. 7 shows a cross-section along the line B-B shown in FIG. 5.

As can be seen in particular from the exploded view of FIG. 4, the sliding plate 216 rests slidably on the calotte to be connected above to the second structure part. Thus, the primary sliding surface 226 of the structural sliding bearing 210 is disposed between the calotte and the sliding plate 216. As shown in the plan view of FIG. 5 and the cross-sections of FIGS. 6 and 7, the primary sliding surface 226 includes two partial sliding surfaces 228A and 228B that are inclined with respect to each other. Both partial sliding surfaces 228A and 228B are arranged in two mutually angled sliding planes 230A and 230B, which meet in a common horizontal line of intersection S. The line of intersection S forms the axis of movement A of the structural sliding bearing 210, along which the sliding plate 216 can move. Thus, appropriate displacements of the first structure part relative to the second structure part can be permitted.

The two partial sliding surfaces 228A and 228B, which are inclined to each other, are arranged in such a way that the corresponding sliding planes 230A and 230B form the shape of a pitched roof. Conceivable here would also be the shape of an upside-down pitched roof (not shown), with the axis of movement A in each case forming the ridge of the pitched roof. Furthermore, the two mutually inclined partial sliding surfaces 228A and 228B are of equal size and are formed symmetrically with respect to each other with respect to a plane of symmetry E extending through the line of intersection S in the vertical direction. Alternatively, the two mutually inclined partial sliding surfaces 228A and 228B could also be of different sizes (not shown).

In addition, the primary sliding surface 226 has a sliding material 232 to reduce friction between the calotte and the sliding plate 216. In this case, each of the two mutually inclined partial sliding surfaces 228A and 228B has a permanently lubricated polymer sliding disk, each of which is mounted in a recess 234 on the calotte. The polymer sliding disk is made of PTFE, UHMWPE, POM, and/or PA and has preformed lubrication pockets in which lubricant can be stored and delivered evenly over the entire contact surface. As a result, the sliding material 232 has a very low coefficient of friction and is particularly low-wear in its use. In the present embodiment, the coefficient of friction is a maximum of 0.03.

The special arrangement of the primary sliding surface 226 or the two partial sliding surfaces 228A and 228B, which are inclined relative to each other, enables a functional combination of vertical and horizontal force transfer. Thus, the structural sliding bearing 210 can, on the one hand, absorb vertically acting forces via the two mutually inclined partial sliding surfaces 228A and 228B and transfer them from the second structure part to the first structure part. In this embodiment, vertically acting forces are thus introduced from the second structure part into the first structure part via the sliding plate 216, the calotte and the bearing base 212. On the other hand, horizontal forces directed transversely to the axis of movement A can also be absorbed by the two mutually inclined partial sliding surfaces 228A and 228B and transmitted accordingly between the two structure parts.

The ratio of absorbable vertical loads and horizontal forces transverse to the axis of movement A can be adjusted by the inclination of the two partial sliding surfaces 228A and 228B or the corresponding two sliding planes 230A and 230B. Thus, both sliding planes 230A and 230B include a first angle α selected such that no gap occurs in the area of the primary sliding surface 226 when the structural sliding bearing 210 is in use. In fact, the first angle α of the structural sliding bearing 210 is selected such that no gap occurs in the area of the primary sliding surface 226 even in the ultimate limit state of the structural sliding bearing 210. The structural sliding bearing 210 shown in FIGS. 3 to 7 has a first angle of 168 degrees. However, if the structural sliding bearing 210 is to be designed for very high horizontal forces, a more acute first angle α may be used.

Alternatively or additionally, the inclination of the two sliding planes 230A and 230B can also be specified via their intersection angle with respect to the horizontal H. Thus, both sliding planes 230A and 230B are inclined downward by a second angle β with respect to the horizontal H. In the present embodiment, both sliding planes 230A and 230B of the structural sliding bearing 210 have the same second angle β, which is 6 degrees. However, in the case of very high horizontal force application, a particularly steep angle may be selected. It would also be possible for the sliding plane 230A to have a different second angle β than the sliding plane 230B, in order to specifically accommodate different levels of force application from different directions (not shown).

Figure 8:
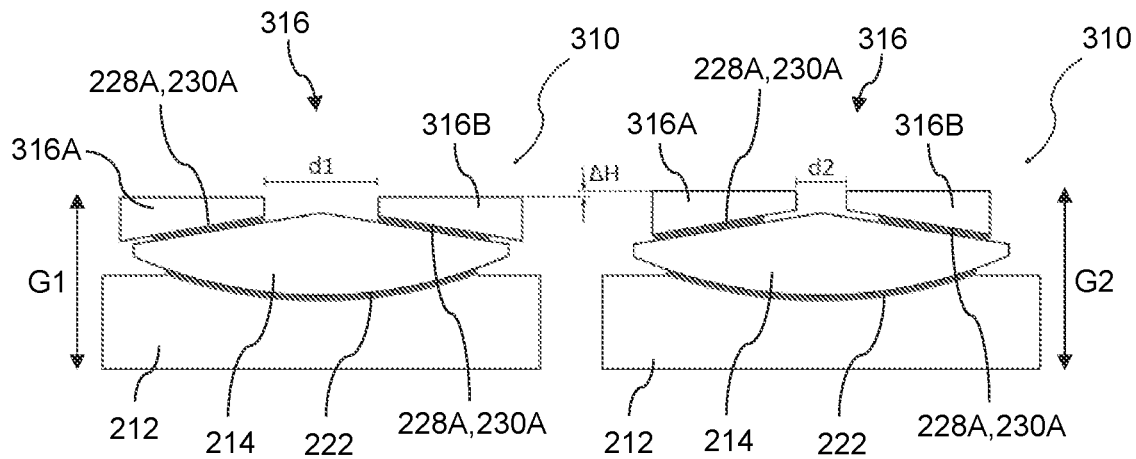
FIG. 8 shows a sequence of schematic cross-sectional representations of a structural sliding bearing in the form of a spherical bearing according to a second embodiment, which illustrates a height adjustment of the structural sliding bearing.

FIG. 8 illustrates a sequence of two schematic cross-sectional views of a structural sliding bearing 310 according to a second embodiment, illustrating a height adjustment of the structural sliding bearing. The structural sliding bearing 310 is substantially similar to the structural sliding bearing 210 of the first embodiment. The identical components will not be further discussed below.

However, the structural sliding bearing 310 differs from the structural sliding bearing 210 of the first embodiment in that the sliding plate 316 is formed in multiple parts and the distance between the corresponding sliding plate parts 316A and 316B is adjustable. In this embodiment, the sliding plate 316 is merely divided into two halves so that the sliding plate 316 is formed by two identically sized sliding plate portions 316A and 316B. The two sliding plate portions 316A and 316B are each disposed along one of the two partial sliding surfaces 228A and 228B, which are inclined with respect to each other, to cooperate to provide a horizontal connection of the second structure part.

In the left of the two cross-sections of FIG. 8, an initial state of the structural sliding bearing 310 before height adjustment is shown. The two sliding plate parts 316A and 316B are arranged separated from each other with the horizontal first distance d1. In this case, both sliding plate parts 316A and 316B have the same horizontal distance from the movement axis A. With this arrangement, the structural sliding bearing 310 has a first overall height G1.

If the two sliding plate parts 316A and 316B are now synchronously pushed towards or away from each other along the respective partial sliding surfaces 228A and 228B, the first overall height G1 of the structural sliding bearing is changed by a height difference H. Thus, a simple height adjustment of the structural sliding bearing 310 is enabled. In the right cross-section of FIG. 8, an example of a final state of the structural sliding bearing 310 is shown after the two sliding plate portions 316A and 316B have been appropriately moved toward each other. As can be seen from the illustration, the horizontal first distance d1 between the two sliding plate portions 316A and 316B has decreased to the horizontal second distance d2. Nevertheless, both sliding plate parts 316A and 316B still have the same horizontal distance from the axis of movement A, respectively. Thus, the first total height G1 is correspondingly increased by the height difference ΔH to a second total height G2. If, on the other hand, the two sliding plate parts 316A and 316B are moved apart, the first total height G1 is reduced accordingly.

Figure 9:
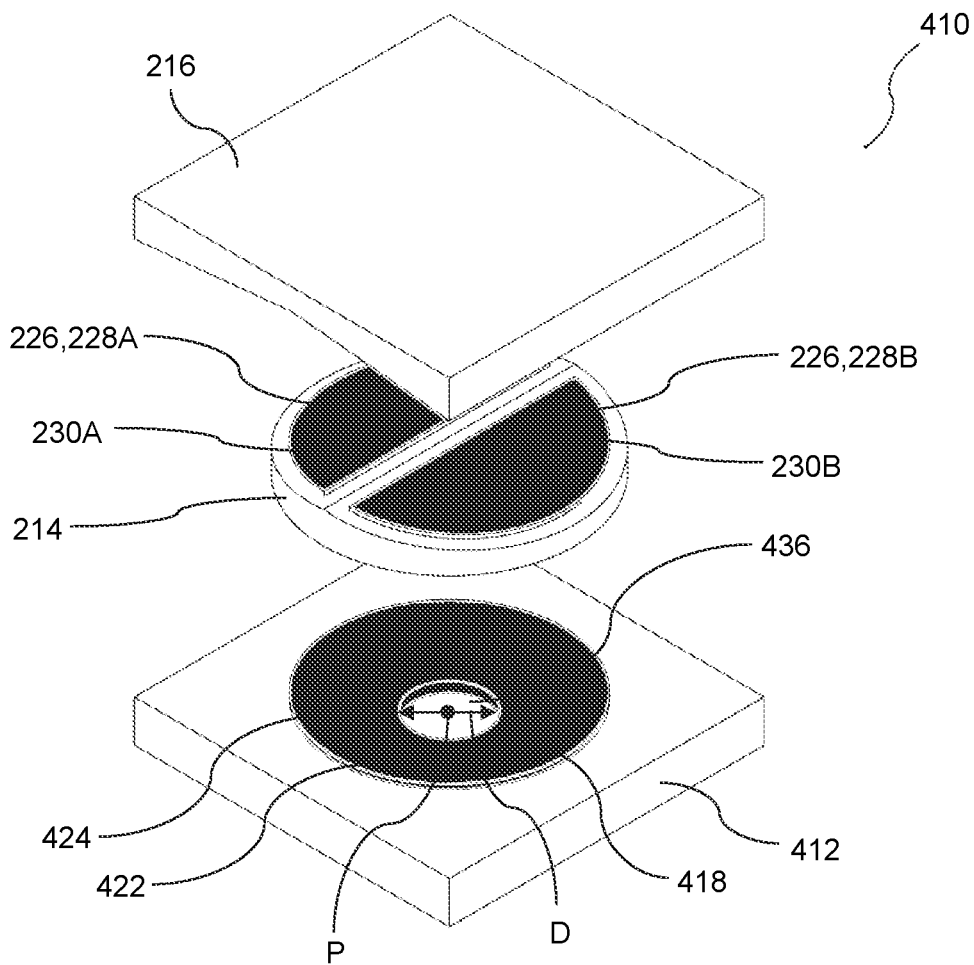
FIG. 9 shows an exploded view of a structural sliding bearing in the form of a spherical bearing according to a third embodiment.

FIG. 9 shows a schematic exploded view of a structural sliding bearing 410 according to the invention, in accordance with an advantageous third embodiment. The structural sliding bearing 310 corresponds essentially to the structural sliding bearing 210 of the first embodiment. The identical components will not be further discussed below.

However, the structural sliding bearing 410 differs from the structural sliding bearing 210 of the first embodiment in that the concave portion 418 of the bearing base 412 includes a recess 436 at a lower pole P, such that in the area of the recess 436 the convex portion 220 of the calotte does not contact the concave portion 418 of the bearing base 412. In the present embodiment, this recess 436 is formed in the polymer sliding disk of the sliding material 424 in the area of the secondary sliding surface 422. In this regard, the recess 436 has a circular shape that is centered with respect to the lower pole P.

The recess 436 at the lower pole P increases the radius of inertia. Accordingly, the counteracting pressure from the acting vertical load increases compared to the pressure from the lifting horizontal force. This ratio can be controlled by the diameter D of the recess 436. Thus, on the one hand, even greater forces can be accommodated by the structural sliding bearing 410. On the other hand, the structural sliding bearing 410 with the recess 436 offers a further adjustment possibility to adjust the ratio between absorbable vertical forces and horizontal forces. Thus, the choice of the inclination of the two partial sliding surfaces 228A and 228B inclined to each other can be adapted to the diameter D of the recess 436 in order to optimally design the structural sliding bearing 410 for a wide variety of force effects.

Figure 10:
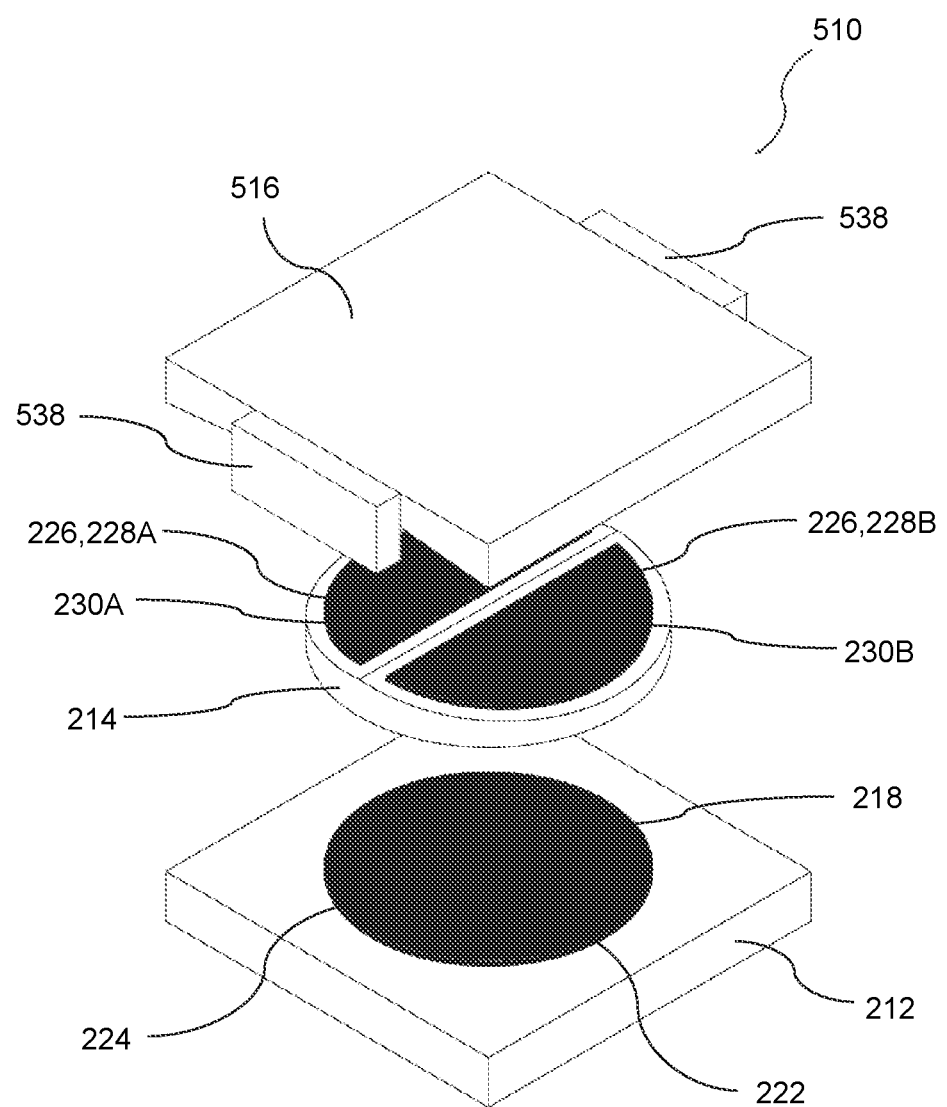
FIG. 10 shows an exploded view of a structural sliding bearing in the form of a spherical bearing according to a fourth embodiment.

In FIG. 10, a schematic exploded view of a structural sliding bearing 510 according to the invention is shown according to an advantageous fourth embodiment. The structural sliding bearing 510 corresponds substantially to the structural sliding bearing 210 of the first embodiment. The identical components will not be further discussed below.

The structural sliding bearing 510 differs from the structural sliding bearing 210 of the first embodiment in that the sliding plate 516 includes two abutments 538. The abutments 538 are each centrally, laterally, and oppositely disposed on the sliding plate 538. Both stops 538 project in the direction of the bearing base 212, so that the abutments 538 are arranged between the bearing base 212 and the sliding plate 516. Thus, the movement of the sliding plate 516 relative to the bearing base 212 is limited. In this embodiment, the abutments 538 are configured to convert the structural sliding bearing 510 into a fixed bearing.

Figure 11:
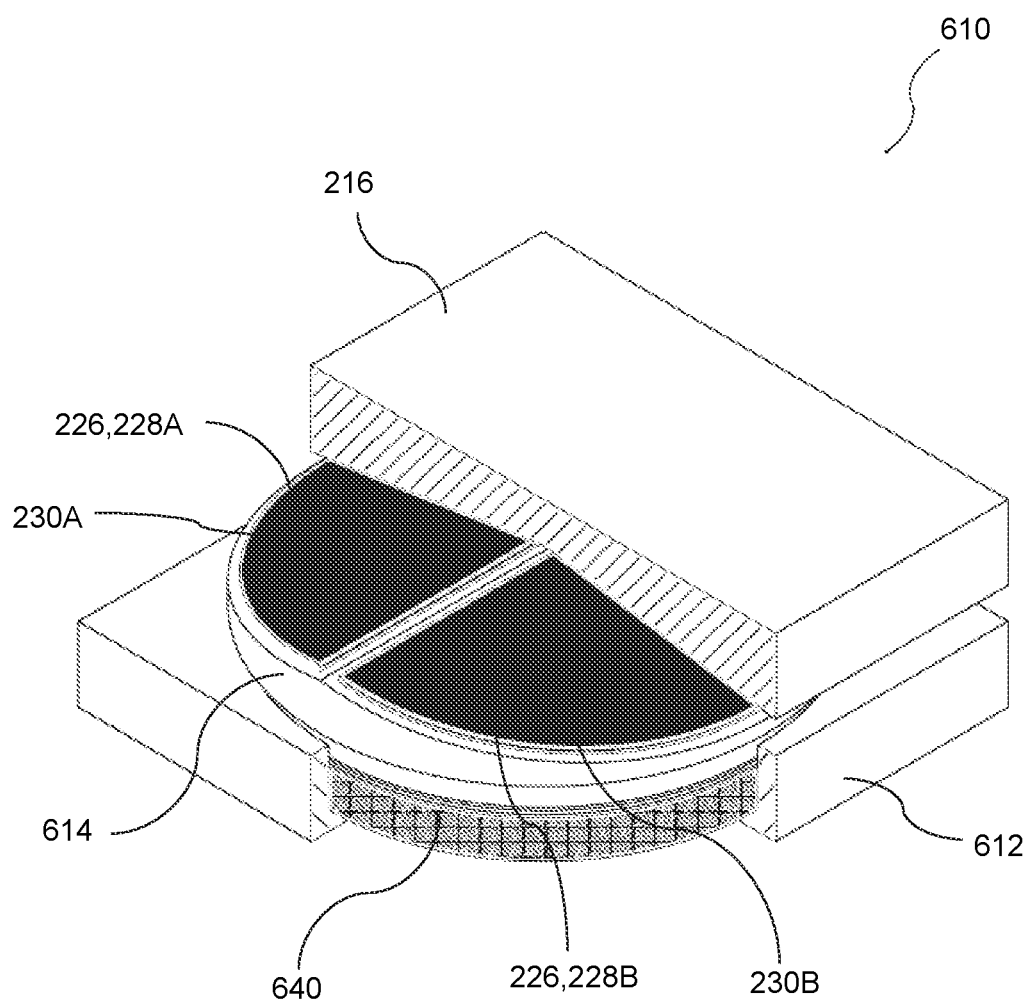
FIG. 11 shows an exploded view of a structural sliding bearing in the form of a pot bearing according to a fifth embodiment.

FIG. 11 shows a perspective view of a structural sliding bearing 610 according to the invention, according to an advantageous fifth embodiment. The structural sliding bearing 610 is substantially identical to the structural sliding bearing 210 of the first embodiment. The identical components will not be further discussed below.

However, the structural sliding bearing 610 differs from the structural sliding bearing 210 of the first embodiment in that it is configured as a pot bearing. Thus, the intermediate bearing part 614 is formed as a pot lid on which the sliding plate 216 rests in a slidable manner. The bearing base 612, on the other hand, has a pot together with an elastomeric pad 640 in order to allow minor rotations or displacements of the pot lid arranged above it and thus of the pot bearing. All advantages of the discussed primary sliding surface apply accordingly.

Figure 12:
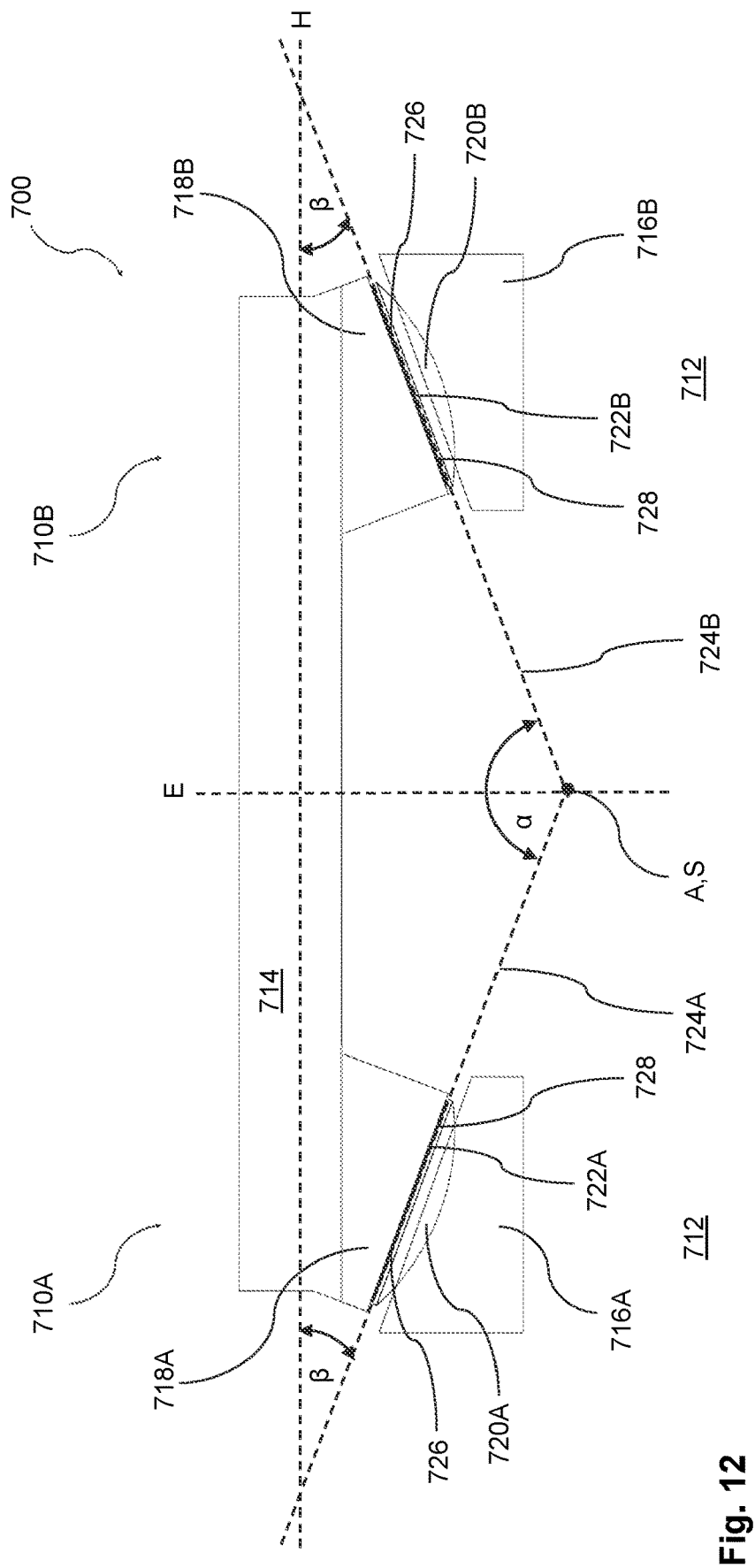
FIG. 12 shows a schematic side view of a structural bearing system according to a first embodiment.

In FIG. 12, a schematic side view of a structural bearing system 700 according to the invention is shown in accordance with a first embodiment. Here, the advantages of the previously described structural sliding bearings are realized by two separate sliding bearings 710A and 710B. Thus, the structural bearing system 700 has a first sliding bearing 710A and a second sliding bearing 710B to connect a first structure part 712 to a second structure part 714. In this example, the first sliding bearing 710A and the second sliding bearing 710B are each sliding and tilting bearings.

The first sliding and tilting bearing 710A and the second sliding and tilting bearing 710B have principally the identical components. Thus, the first sliding and tilting bearing 710A includes a bearing base 716A that can be attached to the first structure part 712, a sliding plate 718A that can be attached to the second structure part 714, and an intermediate bearing part 720A or a tilting part that is arranged between the bearing base 716A and the sliding plate 718A. In this regard, a planar primary sliding surface 722A of the first sliding and tilting bearing 710A extends between the intermediate bearing portion 720A and the sliding plate 718A.

The second sliding and tilting bearing 710B also has a bearing base 716B that can be attached to the first structure part 712, a sliding plate 718B that can be attached to the second structure part 714, and an intermediate bearing part 720B or tilting part that is arranged between the bearing base 716B and the sliding plate 718B. Accordingly, a planar primary sliding surface 722B of the second sliding and tilting bearing 710B also extends here between the intermediate bearing portion 720B and the sliding plate 718B.

Both sliding and tilting bearings 710A and 710B form a uniaxially guided pair of bearings, in which the primary sliding surface 722A of the first sliding and tilting bearing 710A is arranged in a first sliding plane 724A inclined with respect to the horizontal H. Also, the primary sliding surface 722B of the second sliding and tilting bearing 710B is arranged in a second sliding plane 724B inclined with respect to the horizontal H. Thereby, both sliding planes 724A and 724B meet in a common horizontal line of intersection S, which thus forms the axis of movement A of the pair of bearings and along which the two sliding plates 718A and 718B can move. Thus, corresponding displacements of the first structure part 712 with respect to the second structure part 714 can be permitted.

The two inclined primary sliding surfaces 722A and 722B are arranged in such a way that the first sliding plane 724A and the second sliding plane 724B form the shape of an upside-down pitched roof. Conceivable here would also be the shape of a normal pitched roof (not shown), with the axis of movement A in each case forming the ridge of the pitched roof. Furthermore, the two mutually inclined primary sliding surfaces 722A and 722B are of equal size and are formed symmetrically with respect to each other with respect to a plane of symmetry E extending through the line of intersection S in the vertical direction. Alternatively, the two mutually inclined primary sliding surfaces 722A and 722B could also be of different sizes (not shown).

In addition, each of the two primary sliding surfaces 722A and 722B includes a sliding material 726 to reduce friction between the two intermediate bearing portions 720A and 720B and the respective sliding plate 718A and 718B. In this case, each of the two inclined primary sliding surfaces 722A and 722B includes a permanently lubricated polymer sliding disk, each of which is disposed in a recess 728 on the respective intermediate bearing member 720A and 720B. The polymer sliding disk is made of PTFE, UHMWPE, POM and/or PA and has pre-formed lubrication pockets in which the lubricant can be stored and delivered evenly over the entire contact surface. As a result, the sliding material 726 has a very low coefficient of friction and is particularly low-wear in its use. In the present embodiment, the coefficient of friction is a maximum of 0.03.

Due to the special arrangement of the two primary sliding surfaces 722A and 722B, a functional unification of the vertical and horizontal force transfer within the pair of bearings is also achieved here. Thus, on the one hand, the pair of bearings can absorb vertically acting forces via the two inclined primary sliding surfaces 722A and 722B and transmit them from the second structure part 714 to the first structure part 712. In this embodiment, vertically acting forces are thus introduced from the second structure part 714 to the first structure part 712 via the two sliding plates 718A and 718B, the two intermediate bearing parts 720A and 720B and the bearing bases 716A and 716B, respectively. On the other hand, horizontal forces directed transversely to the axis of movement A can also be absorbed by the two primary sliding surfaces 722A and 722B, which are inclined relative to one another, and transmitted accordingly between the two structure parts 712 and 714.

The ratio of absorbable vertical loads and horizontal forces transverse to the axis of movement A can be adjusted by the inclination of the two primary sliding planes 722A and 722B or the first sliding plane 724A and the second sliding plane 724B. Thus, both sliding planes 724A and 724B include a first angle α selected such that no gap is formed in the area of the two primary sliding surfaces 722A and 722B when the structural bearing system 700 is in use. The first angle α of the structural bearing system 700 is even selected such that no gap occurs in the area of the two primary sliding surfaces 722A and 722B even in the ultimate limit state of the structural bearing system 700. The illustrated structural bearing system 700 has a first angle α of 140 degrees. However, if the structural bearing system 700 is to be designed for less high horizontal forces, a more obtuse first angle α may be used, such as between 160 degrees and 180 degrees or exactly 168 degrees.

Alternatively or supplementarily, the inclination of the first sliding plane 724A and the second sliding plane 724B can also be specified via their angle of intersection with respect to the horizontal H. Thus, both sliding planes 724A and 724B are inclined downwardly relative to the horizontal H by a second angle R. In the present embodiment, both sliding planes 724A and 724B of the structural bearing system 700 have the same second angle β, which is 20 degrees in this case. However, a shallower second angle β may be selected if the horizontal force application is less, such as between 0 degrees and 10 degrees or exactly 6 degrees. It would also be possible for the sliding plane 724A to have a different second angle β than the sliding plane 724B, in order to specifically accommodate different levels of force application from different directions (not shown).

Since in the structural bearing system 700 the two sliding and tilting bearings 710A and 710B each have a separate sliding plate 718A and 718B, a simple height adjustment also succeeds here with the aid of the corresponding pair of bearings. The principle of the height adjustment shown in FIG. 8 can be applied, wherein the two sliding plates 718A and 718B each represent a sliding plate part 316A and 316B, respectively, of the two-part sliding plate 316.

Figure 13:
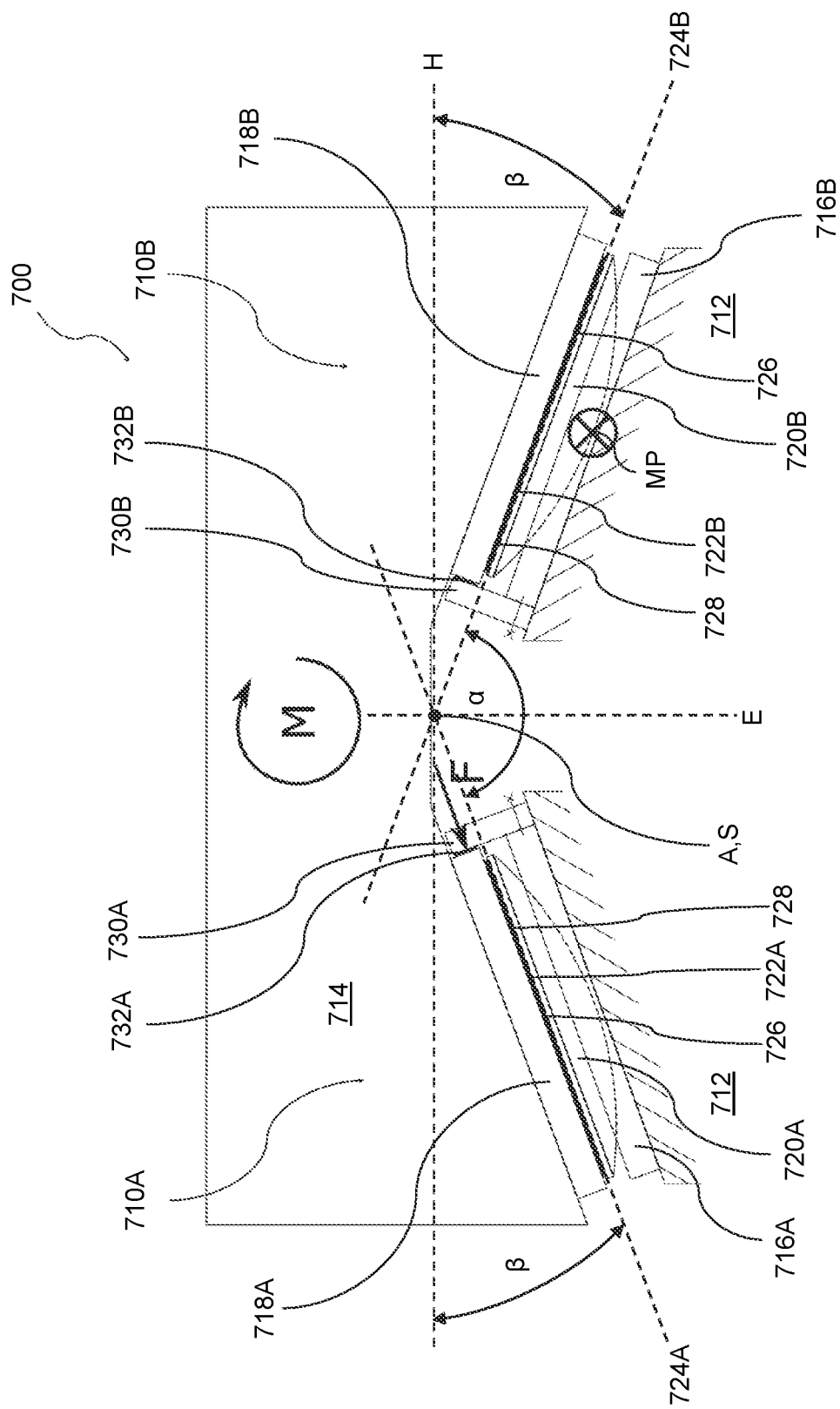
FIG. 13 shows a schematic side view of a structural bearing system according to a second embodiment.

In FIG. 13, a schematic side view of a structural bearing system 700 according to the invention is shown according to a second embodiment. The structural bearing system 700 of the second embodiment corresponds essentially to the structural bearing system 700 of the first embodiment. The components of the same design will not be further discussed in the following.

The structural bearing system 700 of the second embodiment differs from the structural bearing system 700 of the first embodiment in that the two inclined primary sliding surfaces 722A and 722B are arranged such that the first sliding plane 724A and the second sliding plane 724B form the shape of a normal pitched roof. In addition, the first sliding and tilting bearing 710A includes a lateral abutment device 730A that limits movement of the sliding plate 718A relative to the bearing base 716A. The abutment device 730A is arranged on a side of the first sliding and tilting bearing 710A facing the axis of movement A. For this purpose, the abutment device 730A is integrally formed and attached to the bearing base 716A. In addition, the abutment device 730A has a sliding device 732A in the form of a sliding bar which guides the sliding plate 718A in a direction parallel to the axis of movement A. By means of an adjustment device, the lateral distance of the abutment device 730A from the bearing base 716A and thus also from the sliding plate 718A can be adjusted. This is achieved here by a screw connection between the bearing base 716A and the abutment device 730A.

Further, the second sliding and tilting bearing 710B has a lateral abutment device 730B that limits a movement of the sliding plate 718B relative to the bearing base 716B. The abutment device 730B is arranged on a side of the second sliding and tilting bearing 710B facing the axis of movement A. For this purpose, the abutment device 730B is integrally formed and fixed to the bearing base 716B. In addition, the abutment device 730B has a sliding device 732B in the form of a sliding bar which guides the sliding plate 718B in a direction parallel to the axis of movement A. By means of an adjustment device, the lateral distance of the abutment device 730B from the bearing base 716B and thus also from the sliding plate 718B can be adjusted. This is also achieved here by means of a screw connection between the bearing base 716b and the abutment device 730b.

If a torque M acts on the second structure part 714 about an axis parallel to the axis of movement A in a clockwise direction, it is pulled against the abutment device 730A of the first sliding and tilting bearing 710A and is supported on the other side in the instantaneous center of rotation MP in the base of the second sliding and tilting bearing 710B. As a result, a force F acts in the abutment device 730A to counteract the rotation of the second structure part 714. The same applies in the case of a counterclockwise torque. In this case, the second structural component 714 is pulled against the abutment device 730B of the second sliding and tilting bearing 710B and is supported on the other side in the instantaneous center of rotation in the base of the first sliding and tilting bearing 710A.

In this embodiment, both abutment devices 730A and 730B are arranged on the side of the corresponding sliding and tilting bearing 710A and 710B that is higher in the vertical direction. Thus, if the acting torques are small or negligible, mainly the vertical force component of the dead weight acts on the bearing with respect to the operationally induced surcharge load, whereby the abutment devices 730A and 730B are completely free of forces. Thus, with appropriate dimensioning, the abutment devices 730A and 730B are only rarely activated, which is favorable for the life span due to fatigue.

Figure 14:
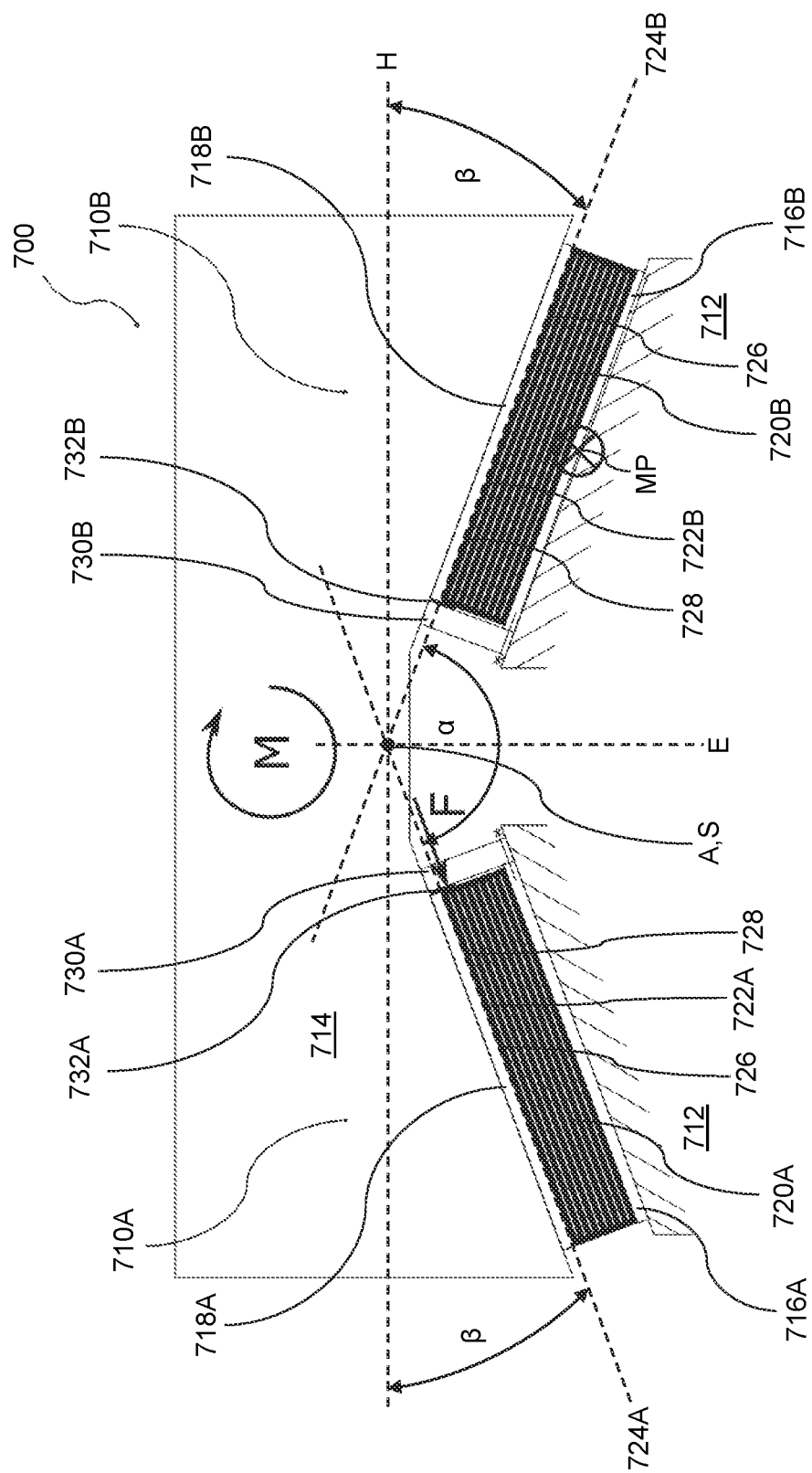
FIG. 14 shows a schematic side view of a structural bearing system according to a third embodiment.

FIG. 14 shows a schematic side view of a structural bearing system 700 according to the invention in accordance with a third embodiment. The structural bearing system 700 of the third embodiment corresponds essentially to the structural bearing system 700 of the second embodiment. The components of the same design will not be further discussed in the following.

The structural bearing system 700 of the third embodiment differs from the structural bearing system 700 of the second embodiment in that the first sliding bearing 710A and the second sliding bearing 710B are designed as elastomeric bearings. For this purpose, the respective intermediate bearing parts 720A and 720B have an elastomer layer which brings with it corresponding deformation properties.

Figure 15:
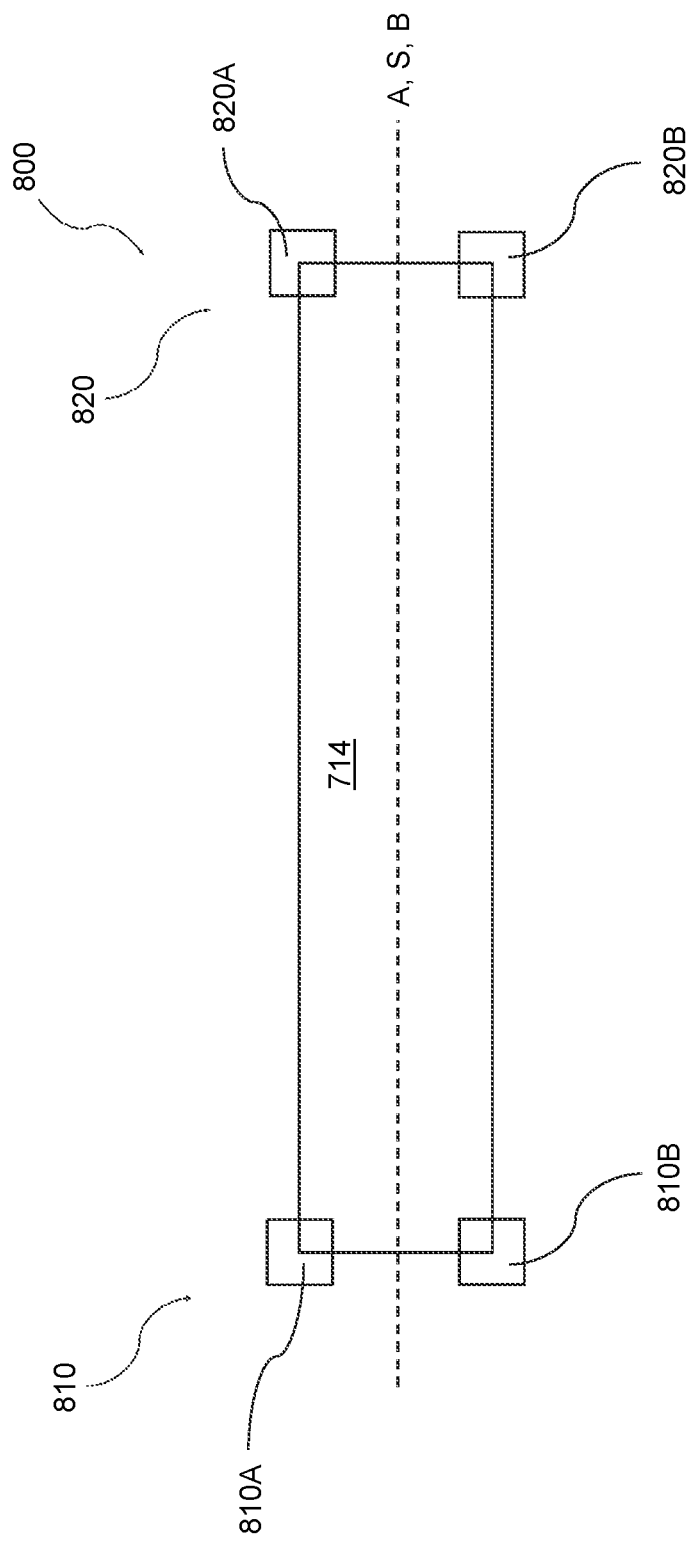
FIG. 15 shows a schematic top view of a structural bearing system according to a fourth embodiment.

In FIG. 15, a schematic top view of a structural bearing system 800 according to the invention is shown according to a fourth embodiment. The structural bearing system 800 has two pairs of bearings 810 and 820 disposed along an axis B. Each pair of bearings 810 and 820 includes two sliding bearings 810A, 810B, 820A, 820B. Thus, the first pair of bearings 810 includes a first sliding bearing 810A and a second sliding bearing 810B. The second pair of bearings 820 includes a first sliding bearing 820A and a second sliding bearing 820B.

The second structure part 714 is supported by the structural bearing system 800. The two pairs of bearings 810 and 820 are thereby arranged at the elongated ends of the second structure part 714, so that a single-span beam is formed. The first pair of bearings 810 corresponds to the pair of bearings of the structural bearing system 700 of the first embodiment, as shown in FIG. 12. Thus, the two primary sliding surfaces angled toward each other are arranged here such that the corresponding sliding planes form an upside-down pitched roof.

The second pair of bearings 820 is likewise essentially the same as that of the first embodiment. Here, however, the two mutually angled primary sliding surfaces are arranged in such a way that the corresponding sliding planes form the shape of a normal pitched roof. Thus, the mutually angled primary sliding surfaces of the pairs of bearings 810, 820 are arranged such that the corresponding sliding planes of the first pair of bearings 810 and the second pair of bearings 820 alternately form along the axis B the shape of a pitched roof and the shape of an upside-down pitched roof. This principle can also be applied to more than two consecutive pairs of bearings. The alternating arrangement of the mutually angled primary sliding surfaces along the axis B can be particularly effective in absorbing torsional torques of the second structure part 714. In another embodiment, pairs of bearings of the structural bearing system 700 of the second or third embodiment are used for the structural bearing system 800.

Figure 16:
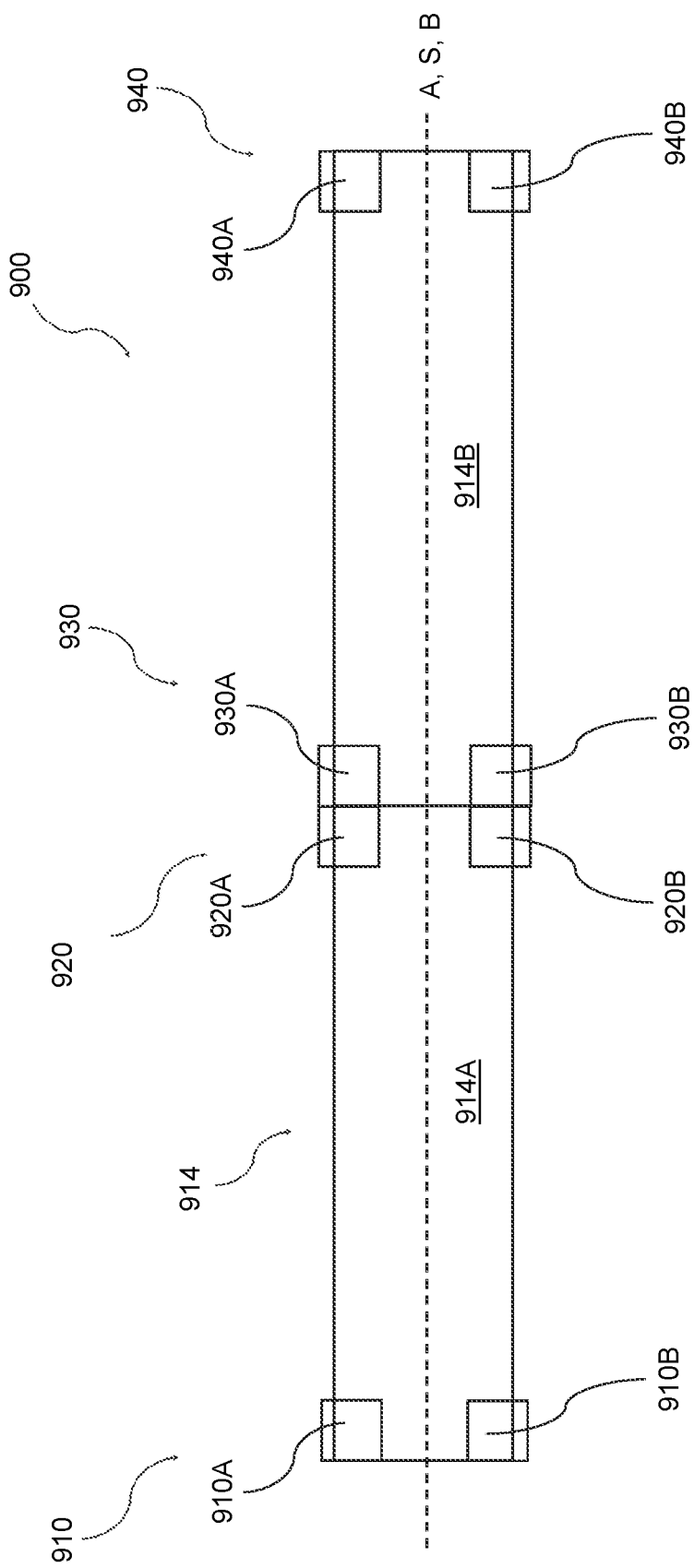
FIG. 16 shows a schematic top view of a structural bearing system according to a fifth embodiment.

FIG. 16 shows a schematic top view of a structural bearing system 900 according to the invention, according to a fifth embodiment. The structural bearing system 900 has four pairs of bearings 910, 920, 930, 940 arranged along an axis B. Each pair of bearings 910, 920, 930, 940 includes two sliding bearings. Thus, all pairs of bearings 910, 920, 930, 940 include a first sliding bearing 910A, 920A, 930A, 940A and a second sliding bearing 910B, 920B, 930B, 940B. The second structure part 914 comprises two single span beams 914A, 914B. Both single-span beams 914A, 914B are arranged in immediate succession along the axis B. The individual single span beams 914A, 914B could, for example, represent track sections, roadway sections or sections of a pipeline.

As before, the two single span beams 914A, 914B are supported by the pairs of bearings 910, 920, 930, 940 at their elongated ends. Thus, the first single span beam 914A is supported by the first pair of bearings 910 and the second pair of bearings 920. The second single span beam 914B, on the other hand, is supported by the third pair of bearings 930 and the fourth pair of bearings 940.

All pairs of bearings 910, 920, 930, 940 are substantially the same as the pair of bearings of the structural bearing system 700 of the first embodiment. However, here the primary sliding surfaces inclined to each other are arranged in such a way that the corresponding sliding planes of the pairs of bearings 910, 920, 930, 940 alternately form the shape of a pitched roof and the shape of an upside down pitched roof for every second pair of bearings along the axis B. In particular, the two sliding planes of the first pair of bearings 910 and the fourth pair of bearings 940 have the shape of a pitched roof. The two sliding planes of the second pair of bearings 920 and the third pair of bearings 930, on the other hand, are in the form of an upside-down pitched roof. Thus, the same arrangement of the primary sliding surfaces or the sliding planes is used in the area of the connection point of both single span beams 914A, 914B. The inclination of the primary sliding surfaces of the first sliding and tilting bearing 920A of the second pair of bearings 920 and the first sliding and tilting bearing 930A of the third pair of bearings 930 are identical. Thus, the corresponding first angles and second angles are also identical here. The same applies to the primary sliding surfaces of the second sliding and tilting bearing 920B of the second pair of bearings 920 and the second sliding and tilting bearing 930B of the third pair of bearings 930. In this way, a height offset in the area of the connection point between the two single span beams 714A, 714B is kept as small as possible in the event of transverse expansions in the structure. In a further embodiment, pairs of bearings of the structural bearing system 700 of the second or third embodiment are used for the structural bearing system 900.

REFERENCE SIGNS

10 Pot bearing
12 Pot
14 Recess
16 Elastomeric pad
18 Inner seal
20 Pot lid
22 Sliding plate
24 Primary sliding surface
26 Sliding material
28 Central guiding rail
30 Sliding material
110 Spherical bearing
112 Bearing base
114 Calotte
116 Secondary sliding surface
118 Sliding material
120 Sliding plate
122 Primary sliding surface
124 Sliding material
126 Lateral guiding rail
128 Sliding material
210 Structural sliding bearing
212 Bearing base
214 Intermediate bearing part
216 Sliding plate
218 Concave portion
220 Convex portion
222 Secondary sliding surface
224 Sliding material
226 Primary sliding surface
228A Partial sliding surface
228B Partial sliding surface
230A Angled sliding plane
230B Angled sliding plane
232 Sliding material
234 Recess
310 Structural sliding bearing
316 Sliding plate
316A Sliding plate part
316B Sliding plate part
316B Sliding plate part
410 Structural sliding bearing
412 Bearing base
418 Concave portion
422 Secondary sliding surface
424 Sliding material
436 Recess
510 Structural sliding bearing
516 Sliding plate
538 Abutment
610 Structural sliding bearing
612 Bearing base
614 Intermediate bearing part
640 Elastomeric layer
700 Structural bearing system
710A First sliding bearing 710B Second sliding bearing
712 First structure part
714 Second structure part
716A Bearing base
716B Bearing base
718A Sliding plate
718B Sliding plate
720A Intermediate bearing part
720B Intermediate bearing part
722A Primary sliding surface
722B Primary sliding surface
724A First sliding plane
724B Second sliding plane
726 Sliding material
728 Recess
730A Abutment device
730B Abutment device
732A Sliding device
732B Sliding device
800 Structural bearing system
810 First pair of bearings
810A First sliding bearing
810B Second sliding bearing
820 Second pair of bearings
820A First sliding bearing
820B Second sliding bearing
900 Structural bearing system
910 First pair of bearings
910A First sliding bearing
910B Second sliding bearing
914 Second structure part
914A First single span beam
914B Second single span beam
920 Second pair of bearings
920A First sliding bearing
920B Second sliding bearing
930 Third pair of bearings
930A First sliding bearing
930B Second sliding bearing
940 Fourth pair of bearings
940A First sliding bearing
940B Second sliding bearing
A Axis of movement
B Axis
D Diameter
E Plane of symmetry
F Force
G1 First overall height
G2 Second overall height
H Horizontal
M Torque
MP Instantaneous center of rotation
P Lower pole
S Line of intersection
d1 First distance
d2 Second distance
α First angle
β Second angle
ΔH Height difference

What is claimed is:

1. A structural sliding bearing for connecting a first structure part to a second structure part, comprising:
a bearing base that can be attached to the first structure part;
a sliding plate that can be attached to the second structure part; and
an intermediate bearing part disposed between the bearing base and the sliding plate, wherein a primary sliding surface of the structural sliding bearing is disposed between the intermediate bearing part and the sliding plate,
characterized in that
the primary sliding surface comprises at least two partial sliding surfaces each arranged in sliding planes angled with respect to one another, the sliding planes meeting in a common line of intersection(S) forming an axis of movement (A) of the structural sliding bearing along which the sliding plate can move; and
the two sliding planes enclose a first angle (a), wherein the first angle (a) is selected such that with maximal horizontal force in combination with minimal vertical force contact of the primary sliding surface is maintained.

2. The structural sliding bearing according to claim 1, characterized in that
the structural sliding bearing is a uniaxially guided structural sliding bearing in which the sliding plate can only move along the axis of movement (A) relative to the intermediate bearing part.

3. The structural sliding bearing (210) according to claim 1, characterized in that
the two sliding planes are arranged so that the line of intersection(S) is horizontal.

4. The structural sliding bearing according to claim 1, characterized in that
the first angle (a) is selected in such a way that with maximal horizontal force in combination with minimal vertical force contact of the primary sliding surface is maintained in the entire area of the primary sliding surface.

5. The structural sliding bearing according to claim 1, characterized in that
the primary sliding surface has a permanently lubricated sliding material.

6. The structural sliding bearing of claim 5, characterized in that
the sliding material has a coefficient of friction not exceeding 0.03.

7. The structural sliding bearing according to claim 5, characterized in that
the sliding material comprises at least one lubricated sliding disk.

8. The structural sliding bearing according to claim 1, characterized in that
the at least two partial sliding surfaces angled relative to one another are arranged in such a way that the corresponding sliding planes form the shape of a pitched roof.

9. The structural sliding bearing according to claim 1, characterized in that
at least two partial sliding surfaces angled relative to one another are arranged in such a way that the corresponding sliding planes form the shape of an upside-down pitched roof.

10. The structural sliding bearing according to claim 1, characterized in that
at least two partial sliding surfaces angled relative to one another are formed symmetrically relative to one another with respect to a plane of symmetry (E) extending through the line of intersection(S) in the vertical direction.

11. The structural sliding bearing according to claim 1, characterized in that
the at least two partial sliding surfaces angled relative to one another of the primary sliding surface are formed with different sizes.

12. The structural sliding bearing according to claim 1, characterized in that
at least one sliding plane is inclined downwardly with respect to the horizontal (H) by a second angle (B) between 0 degrees and 10 degrees, or by 6 degrees.

13. The structural sliding bearing according to claim 1, characterized in that
the first angle (a) is between 160 degrees and 180 degrees, or at 168 degrees.

14. The structural sliding bearing according to claim 1, characterized in that
the sliding plate is multi-part and the distance between the corresponding sliding plate parts is adjustable.

15. The structural sliding bearing according to claim 1, characterized in that
the structural sliding bearing is designed as a pot bearing, in which the intermediate bearing part has a pot lid and the bearing base has a pot together with an elastomeric pad.

16. The structural sliding bearing according to claim 1, characterized in that
the structural sliding bearing is designed as a spherical bearing in which the intermediate bearing part comprises a calotte,
wherein the calotte has a convex portion and the bearing base has a corresponding concave portion, and the convex portion of the calotte is slidably disposed in the concave portion of the bearing base.

17. The structural sliding bearing of claim 16, characterized in that
the concave portion of the bearing base has a recess at a lower pole (P), so that in the area of the recess the convex portion of the calotte does not come into contact with the concave portion of the bearing base.

18. The structural sliding bearing of claim 17, characterized in that
the recess is circularly centered to the lower pole (P).

19. The structural sliding bearing according to claim 17, characterized in that
a sliding material is arranged at the concave portion of the bearing base, and the recess is formed in the sliding material.

20. The structural sliding bearing according to claim 16, characterized in that
the structural sliding bearing further comprises at least one abutment between the sliding plate and the bearing base.

21. The structural sliding bearing according to claim 5, wherein the sliding material comprises PTFE, UHMWPE, POM and/or PA.

22. The structural sliding bearing according to claim 7, wherein the at least one lubricated sliding disk comprises at least one lubrication pocket.

23. A structural bearing system comprising at least two sliding bearings for connecting at least two structure parts, each sliding bearing comprising:
a bearing base that can be attached to a first structure part;
a sliding plate that can be attached to a second structure part; and
an intermediate bearing part disposed between the bearing base and the sliding plate, wherein at least one plane primary sliding surface of the sliding bearing is disposed between the intermediate bearing part and the sliding plate,
characterized in that
the two sliding bearings form a pair of bearings in which the primary sliding surface of the first sliding bearing is arranged in a first sliding plane angled to the horizontal (H) and the primary sliding surface of the second sliding bearing is arranged in a second sliding plane angled to the horizontal (H), wherein the sliding planes meet in a common line of intersection(S) forming an axis of movement (A) of the pair of bearings along which the sliding plates can move, and wherein the first sliding plane and the second sliding plane enclose a first angle (a), wherein the first angle (a) is selected such that with maximal horizonal force in combination with minimal vertical force contact of the primary sliding surfaces is maintained.

24. The structural bearing system according to claim 23, characterized in that
the least two sliding bearings are designed as sliding and tilting bearings or as elastomeric bearings.

25. The structural bearing system according to claim 23, characterized in that
the first angle (a) is between 160 degrees and 180 degrees, or at 168 degrees.

26. The structural bearing system according to claim 23, characterized in that
the first angle (a) is selected in such a way that with maximal horizonal force in combination with minimal vertical force contact of the primary sliding surfaces is maintained in the entire area of the primary sliding surfaces.

27. The structural bearing system according to claim 23, characterized in that
the pair of bearings is a uniaxially guided pair of bearings in which the sliding plates can only move along the axis of movement (A) relative to the intermediate bearing parts.

28. The structural bearing system according to claim 23, characterized in that
the first sliding plane and the second sliding plane are arranged such that the line of intersection(S) is horizontal.

29. The structural bearing system according to claim 23, characterized in that
the at least one primary sliding surface comprises a permanently lubricated sliding material.

30. The structural bearing system according to claim 29, characterized in that
the sliding material has a coefficient of friction not exceeding 0.03.

31. The structural bearing system according to claim 29, characterized in that
the sliding material comprises at least one lubricated sliding disk.

32. The structural bearing system according to claim 23, characterized in that
at least two primary sliding surfaces angled relative to one another are formed symmetrically relative to one another with respect to a plane of symmetry (E) extending through the line of intersection(S) in the vertical direction.

33. The structural bearing system according to claim 23, characterized in that
at least two primary sliding surfaces angled relative to one another are formed with different sizes.

34. The structural bearing system according to claim 23, characterized in that at least one sliding plane is inclined downwardly with respect to the horizontal (H) by a second angle (B) between 0 degrees and 10 degrees, or by 6 degrees.

35. The structural bearing system according to claim 23, characterized in that at least two primary sliding surfaces angled towards one another are arranged in such a way that the corresponding sliding planes form the shape of a pitched roof.

36. The structural bearing system according to claim 23, characterized in that at least two primary sliding surfaces angled towards one another are arranged in such a way that the corresponding sliding planes form the shape of an upside-down pitched roof.

37. The structural bearing system according to claim 23, characterized in that the first sliding bearing and/or the second sliding bearing has an abutment device which limits a movement of the sliding plate relative to the bearing base.

38. The structural bearing system according to claim 37, characterized in that the abutment device is arranged on a side of the respective sliding bearing facing or averted from the axis of movement (A).

39. The structural bearing system according to claim 37, characterized in that the abutment device comprises an adjustment device for adjusting a position of the abutment device.

40. The structural bearing system according to claim 37, characterized in that the abutment device comprises a sliding device which guides the sliding plate in a direction parallel to the axis of movement (A).

41. The structural bearing system according to claim 23, characterized in that the structural bearing system comprises at least two pairs of bearings and an axis (B), and the pairs of bearings are arranged in succession along the axis (B), wherein the primary sliding surfaces angled relative to one another are arranged in such a way that the corresponding sliding planes of the pairs of bearings alternately form along the axis (B) the shape of a pitched roof and the shape of an upside-down pitched roof.

42. The structural bearing system according to claim 23, characterized in that the structural bearing system comprises at least two pairs of bearings and an axis (B), and the pairs of bearings are arranged in succession along the axis (B), wherein the primary sliding surfaces angled relative to one another are arranged such that the corresponding sliding planes of the pairs of bearings alternately form the shape of a pitched roof and the shape of an upside-down pitched roof at every second pair of bearings along the axis (B).

* * * * *